United States Patent
Matsuda et al.

(10) Patent No.: US 7,831,957 B2
(45) Date of Patent: Nov. 9, 2010

(54) SYSTEM AND METHOD FOR DIVIDING FUNCTIONS INTO FUNCTIONAL BLOCKS

(75) Inventors: Akio Matsuda, Kawasaki (JP); Quang Zhu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1697 days.

(21) Appl. No.: 10/987,291

(22) Filed: Nov. 15, 2004

(65) Prior Publication Data

US 2005/0100013 A1    May 12, 2005

Related U.S. Application Data

(63) Continuation of application No. PCT/JP02/04652, filed on May 14, 2002.

(51) Int. Cl.
*G06F 9/45* (2006.01)
(52) U.S. Cl. ...................................... 717/116
(58) Field of Classification Search .................. 717/116
See application file for complete search history.

(56) References Cited

U.S. PATENT DOCUMENTS

| | | | |
|---|---|---|---|
| 5,689,711 A * | 11/1997 | Bardasz et al. | 717/105 |
| 6,054,986 A * | 4/2000 | Kato | 715/763 |
| 6,067,639 A * | 5/2000 | Rodrigues et al. | 714/38 |
| 6,698,018 B1 * | 2/2004 | Zimniewicz et al. | 717/175 |
| 6,970,881 B1 * | 11/2005 | Mohan et al. | 707/102 |
| 7,415,706 B1 * | 8/2008 | Raju et al. | 717/170 |
| 7,559,048 B1 * | 7/2009 | Bedell et al. | 717/101 |

FOREIGN PATENT DOCUMENTS

| | | |
|---|---|---|
| JP | 4-54528 | 2/1992 |
| JP | 6-149555 | 5/1994 |
| JP | 6-214773 | 8/1994 |
| JP | 7-129655 | 5/1995 |
| JP | 7-210376 | 8/1995 |
| JP | 8-212061 | 8/1996 |
| JP | 11-238084 | 8/1999 |
| JP | 11-338693 | 12/1999 |

OTHER PUBLICATIONS

International Search Report. for PCT/JP02/04652 mailed Aug. 20, 2002.
Japanese Office Action—Notice of Rejection Grounds for Application No. 2004-508513; mailed Aug. 8, 2006.

* cited by examiner

*Primary Examiner*—John Chavis
(74) *Attorney, Agent, or Firm*—Fujitsu Patent Center

(57) ABSTRACT

A relationship acquisition unit acquires the relationship between a plurality of sequences to be implemented to realize the functions required for a system to be designed and an object to and from which the sequences deliver and receive messages. A grouping unit groups the sequences which deliver and receive messages to and from the same object to make a group of sequences associated with the object. A duplication dissolution unit dissolves, when the same sequence belongs to different groups of sequences in duplication, the duplication of the sequence based on the relationship, between the sequence and other sequences which deliver and receive messages to and from the object to and from which the sequence delivers and receives messages, of the implementation order of the object. An output unit associates each group and outputs the sequences belonging to the group of sequences associated with the functional blocks.

11 Claims, 39 Drawing Sheets

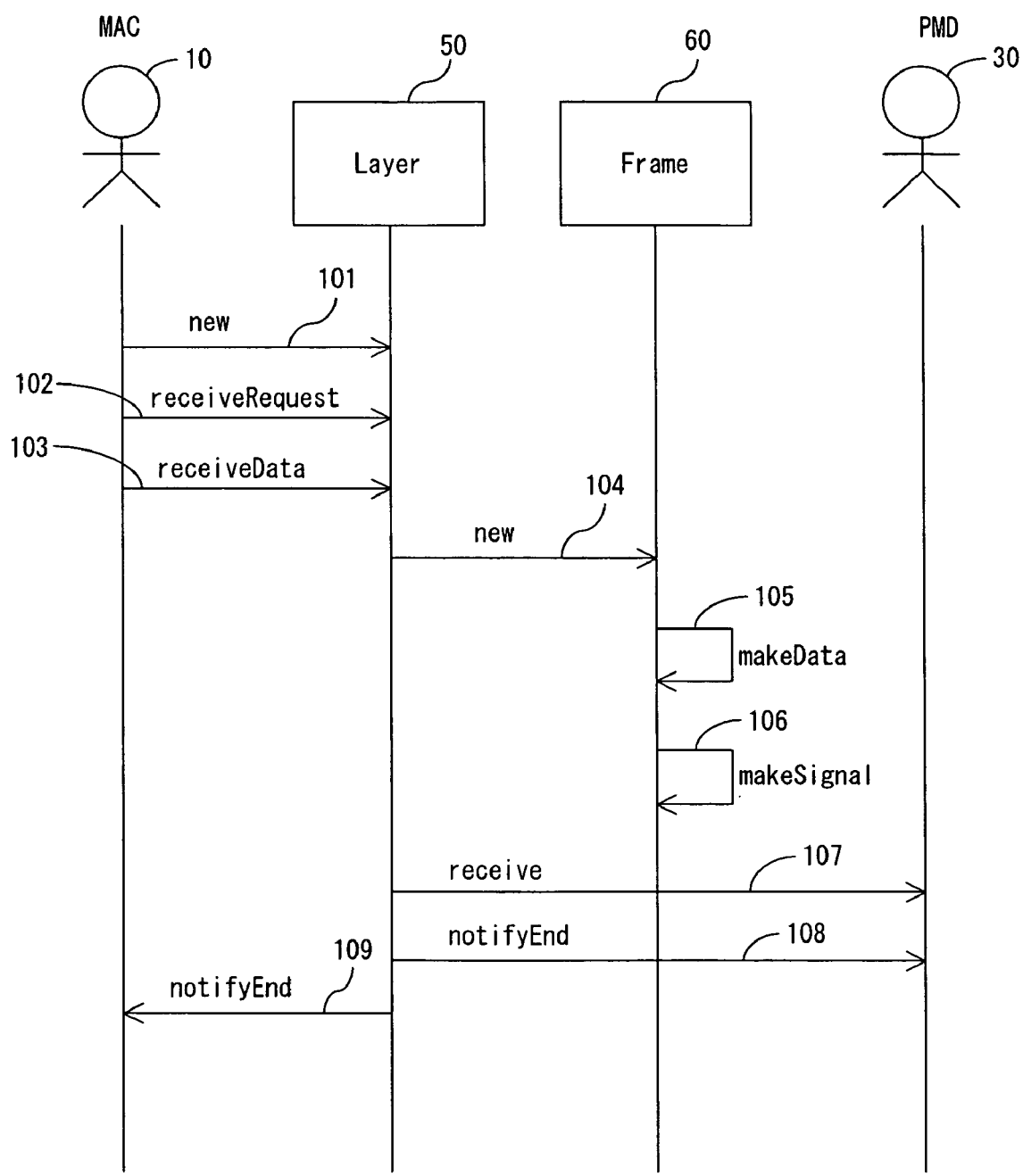
F I G. 6

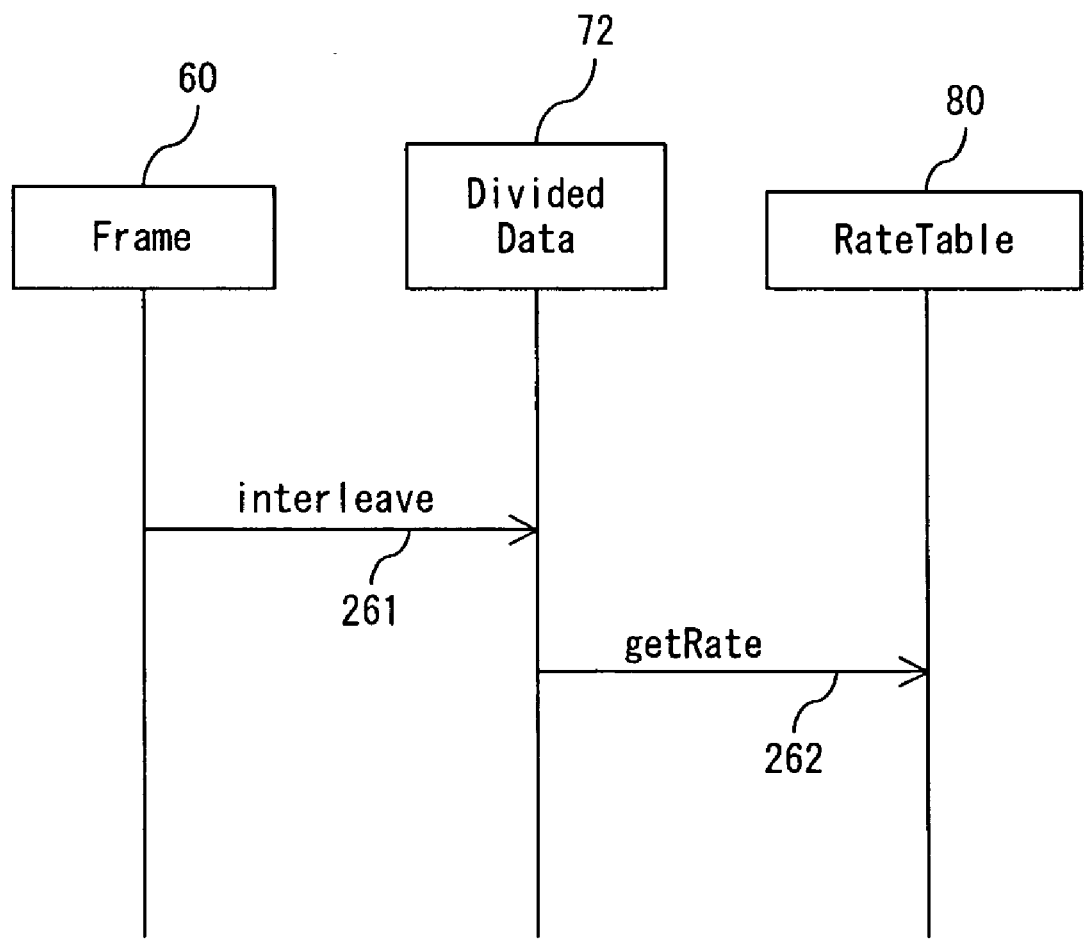
F I G. 1 4

FIG. 18

| SEQUENCE / OBJECT | FIG. 8 | FIG. 9 | FIG. 10 | FIG. 11 | FIG. 12 | FIG. 13 | FIG. 14 | FIG. 15 | FIG. 16 | FIG. 17 |
|---|---|---|---|---|---|---|---|---|---|---|
| 60 Frame | ○ | ○ | ○ | ○ | ○ | ○ | ○ | ○ | ○ | ○ |
| 70 Data | ○ | ○ | ○ | ○ | ○ |  |  |  |  |  |
| 71 CodedData |  |  |  |  | ○ | ○ |  |  |  |  |
| 72 DividedData |  |  |  |  |  | ○ | ○ | ○ |  |  |
| 73 ComplexedData | ○ |  | ○ |  | ○ | ○ | ○ | ○ | ○ |  |
| 80 RateTable |  |  |  |  |  |  | ○ | ○ | ○ |  |
| 90 Scrambler |  |  |  | ○ |  |  |  |  |  |  |
| 91 Encoder |  |  |  |  | ○ |  |  |  |  |  |
| 92 ComplexedEncoding |  |  |  |  |  |  |  | ○ |  |  |
| 93 Pilot |  |  |  |  |  |  |  |  |  | ○ |

| GROUP | SEQUENCE |
|---|---|
| A (Data) | FIG. 8, FIG. 9, FIG. 10, FIG. 11, FIG. 12 |
| B (CodedData) | FIG. 12, FIG. 13 |
| C (DividedData) | FIG. 13, FIG. 14, FIG. 15 |
| D (ComplexedData) | FIG. 15, FIG. 16, FIG. 17 |

| BLOCK | SEQUENCE | REMARKS |
|---|---|---|
| BLOCK1 | FIG. 8, FIG. 9, FIG. 10, FIG. 11, FIG. 12 | GROUP A |
| BLOCK2 | FIG. 13 | GROUP B |
| BLOCK3 | FIG. 14, FIG. 15 | GROUP C |
| BLOCK4 | FIG. 16, FIG. 17 | GROUP D |

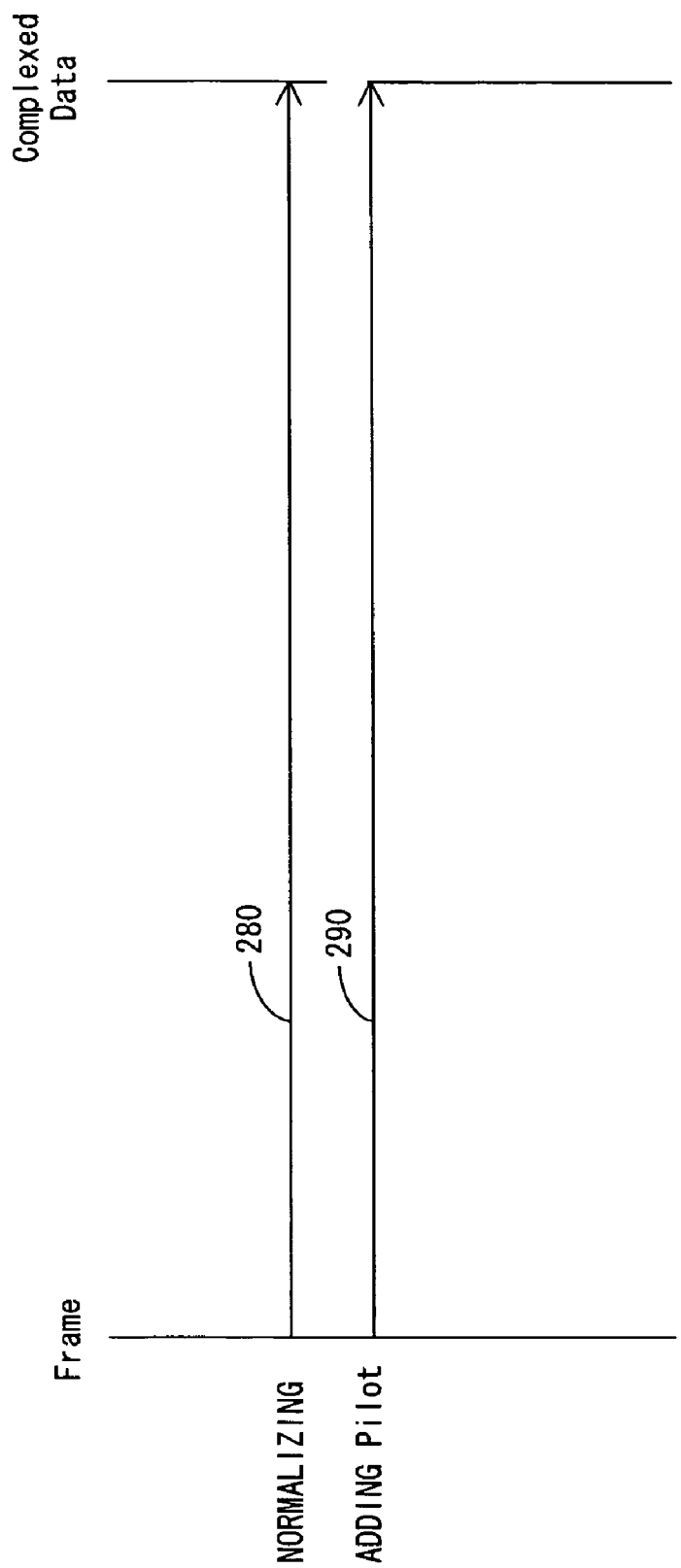

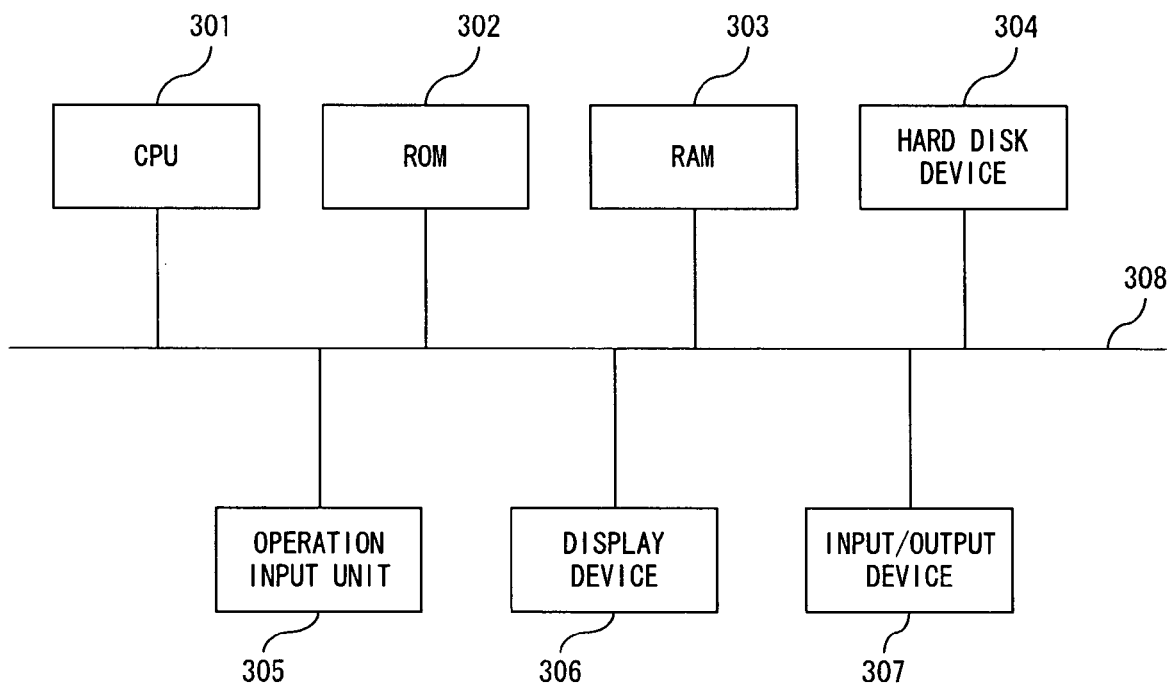
F I G. 2 6

| SEQUENCE / OBJECT | Sequence_1 | Sequence_2 | Sequence_3 | Sequence_4 | Sequence_5 |
|---|---|---|---|---|---|
| Object_A | ○ | ○ | ○ | | |
| Object_B | | ○ | | ○ | |
| Object_C | | | ○ | ○ | ○ |

F I G. 2 9

| SEQUENCE \ OBJECT | Sequence_1 | Sequence_2 | Sequence_3 | Sequence_4 | Sequence_5 |
|---|---|---|---|---|---|
| Object_A | O | O | O | | |
| Object_B | | O | | O | |
| Object_C | | | O | O | O |

Group_A (Object_A, Sequence_1–Sequence_3); Group_B (Object_C, Sequence_4–Sequence_5)

FIG. 30

| OBJECT \ SEQUENCE | Sequence_1 | Sequence_3 | Sequence_2 | Sequence_4 | Sequence_5 |
|---|---|---|---|---|---|
| Object_A | O | O | O | | |
| Object_B | | O | O | O | |
| Object_C | | | | O | O |

Group_A → (Sequence_1, Sequence_3, Sequence_2 for Object_A)
Group_B → (Sequence_4 for Object_B)
Group_C → (Sequence_5 for Object_C)

F I G. 31

| SEQUENCE / OBJECT | Sequence_1 | Sequence_2 | Sequenc_4 | Sequenc_3 | Sequence_5 |
|---|---|---|---|---|---|
| Object_A | ○ | ○ | | ○ | |
| Object_B | | ○ | ○ | | |
| Object_C | | | ○ | ○ | ○ |

Group_A → Sequence_1/Object_A
Group_B → Sequenc_4/Object_B
Group_C → Sequenc_3–Sequence_5/Object_C

| OBJECT \ SEQUENCE | Sequence_1 | Sequence_23 | Sequence_4 | Sequence_5 |
|---|---|---|---|---|
| Object_A | O | O | | |
| Object_B | | O | O | |
| Object_C | | O | O | O |

Group_A → Sequence_1/Object_A
Group_B → Sequence_4/Object_B
Group_C → Sequence_5/Object_C

SYSTEM AND METHOD FOR DIVIDING FUNCTIONS INTO FUNCTIONAL BLOCKS

CROSS REFERENCE TO RELATED APPLICATION

This application is a continuation application of international PCT application No. PCT/JP02/04652 filed on May 14, 2002.

BACKGROUND OF THE INVENTION

1. Field of the Invention

The present invention relates to a technology for aiding a system design, and more specifically, to a technology preferably used when a system to be designed is divided into a plurality of functional blocks and is designed according to each functional block.

2. Description of the Related Art

Described here is a technology for carrying out a system design, for example, of a built-in device which implements some processing for input data and outputs the processed data in accordance with the object-oriented design which is publicly known as a software design technology. In this technology, firstly, the functions required to satisfy the specifications required for a system to be designed are extracted, and then, the procedure for realizing each individual function extracted is indicated as a sequence. The sequence indicates the relationship between the constituents which constitute the system to be designed and the data which is delivered and received among the constituents, and a diagram in which the sequence is chronologically indicated is a sequence diagram.

When sequences are implemented in parallel in a designed system, two cases could generate according to the combination of the sequences to be implemented. One is the case in which data is smoothly delivered and received among the constituents of the system, and the other is the case in which the delivery and receiving of data to and from the same constituent compete at the same time between some sequences, so data is not smoothly delivered and received. When there is a possibility that the latter case takes place, it is necessary to prepare a means for avoiding the competition.

Described below is FIG. 1, which shows the conventional procedure which was used to avoid the competition.

In FIG. 1, three messages arrayed in the order of (1) new, (2) check and (3) addTail are shown. Talking of each message, (1) new implements the sequence of "object a1001 makes object b1002"; (2) check implements the sequence of "confirming that object a1001 can access object b1002"; and (3) addTail implements the sequence of "object a1001 adds other data to the end of the data of object b1002."

When the check sequence is implemented, the processing of judging whether object b1002 is accessible or not is implemented in S2001. In this judgement processing, the judgement result becomes Yes only when no other object (which is not shown in FIG. 1) accesses object b1002, and object a1001 accesses object b1002 in S2002. When the result of the judgement processing in S2001 is No, the judgement processing in S2001 is repeatedly implemented, and while this repeated processing continues, object a1001 does not access object b1002.

For a system which was designed by a conventional design method, it was necessary to prepare a means for avoiding the competition to implement the processing in S2001 and S2002 for all the sequences in which the competition is likely to take place.

In designing a system, the method is generally practiced in which the architecture for realizing the functions peculiar to the system to be designed is added, and parts unnecessary for the system to be designed are removed based on the system to be designed and the system which has specifications similar to the specifications required for the system to be designed and which has already been designed, thus reducing the work load in a system design compared with the method of newly setting all the work loads in the system design. However, when such a design method is employed, since no alteration is added to the combination of sequences (that is, functional blocks) of the system which has been confirmed to properly function and which has already been designed as much as possible, there were a lot of instances in which such a means for avoiding the competition as mentioned above is provided in order to add new sequences, thus preventing the simplification of a system design.

SUMMARY OF THE INVENTION

In view of the above mentioned problems, an object of the present invention is to allocate each sequence to each functional block so that the occurrence of the competition among sequences may be minimized in dividing a system to be designed into a plurality of functional blocks and designing each functional block, when the divided sequences to be implemented to satisfy the required specification of the system are allocated to each functional block.

According to one of the embodiments of the present invention, a functional-block division system is a system for dividing functions into a plurality of functional blocks so that the functions may be constituted by a combination of a plurality of functional blocks. This system includes a relationship acquisition unit for acquiring the relationship between a plurality of sequences to be implemented to realize the functions and an object to and from which the sequences deliver and receive messages; a grouping unit for grouping the sequences which deliver and receive messages to and from the same object to make a group of sequences associated with the object; a duplication dissolution unit for dissolving, when the same sequence belongs to a different group of sequences in duplication, the duplication of the sequence based on the relationship, between the sequence and the other sequences which deliver and receive messages to and from the object to and from which the sequence delivers and receives messages, of the implementation order of the object; and an output unit for outputting the sequence belonging to the group of sequences associated with the functional blocks as a sequence which associates each group to the functional block and makes the functional block implement the sequence.

According to this system, since messages are delivered and received to and from the same object by the sequences belonging to the same functional block, the competition of sequences due to the delivery and receiving of the messages to and from the object does not generate by managing the implementation order of the sequences belonging to the same functional block in advance.

BRIEF DESCRIPTION OF THE DRAWINGS

The present invention will be more apparent from the following detailed description when the accompanying drawings are referenced.

FIG. 6 shows the sequences of the whole system made for the system to be designed.

FIG. 14 shows the sequence which further details the sequence of "providing interleaving" among the sequences shown in FIG. 7.

FIG. 18 is a table showing the relationship between all the sequences required for the operation to "make data" and all the objects to and from which messages are delivered and received in each sequence.

FIG. 19 is a table showing the grouping of sequences implemented based on the relationship shown in FIG. 18.

FIG. 20 is a table showing the results of divided functional blocks of the function of "making data" among the transmission operations which are a required specification of the system to be designed.

FIG. 25 shows the sequence indicating the implementation order of each sequence implemented in functional block 4 shown in FIG. 21.

FIG. 26 shows the configuration of the functional-block division system embodying the present invention.

FIG. 29 is a table showing an example of the relationship between all the sequences necessary to realize a function and all the objects to and from which messages are delivered and received in these sequences.

FIG. 30 is a first example showing the results obtained by trying the grouping which is implemented according to a first method for the sequences shown in the table of FIG. 29.

FIG. 31 is a second example showing the results obtained by trying the grouping which is implemented according to a first method for the sequences shown in the table of FIG. 29.

FIG. 32 is a third example showing the results obtained by trying the grouping which is implemented according to a first method for the sequences shown in the table of FIG. 29.

FIG. 34 is an example showing the results obtained by trying the grouping which is implemented according to a first method for the sequences shown in the second table of FIG. 33.

DESCRIPTION OF THE PREFERRED EMBODIMENTS

Described below are the embodiments of the present invention with reference to the accompanying drawings.

Figure 1:
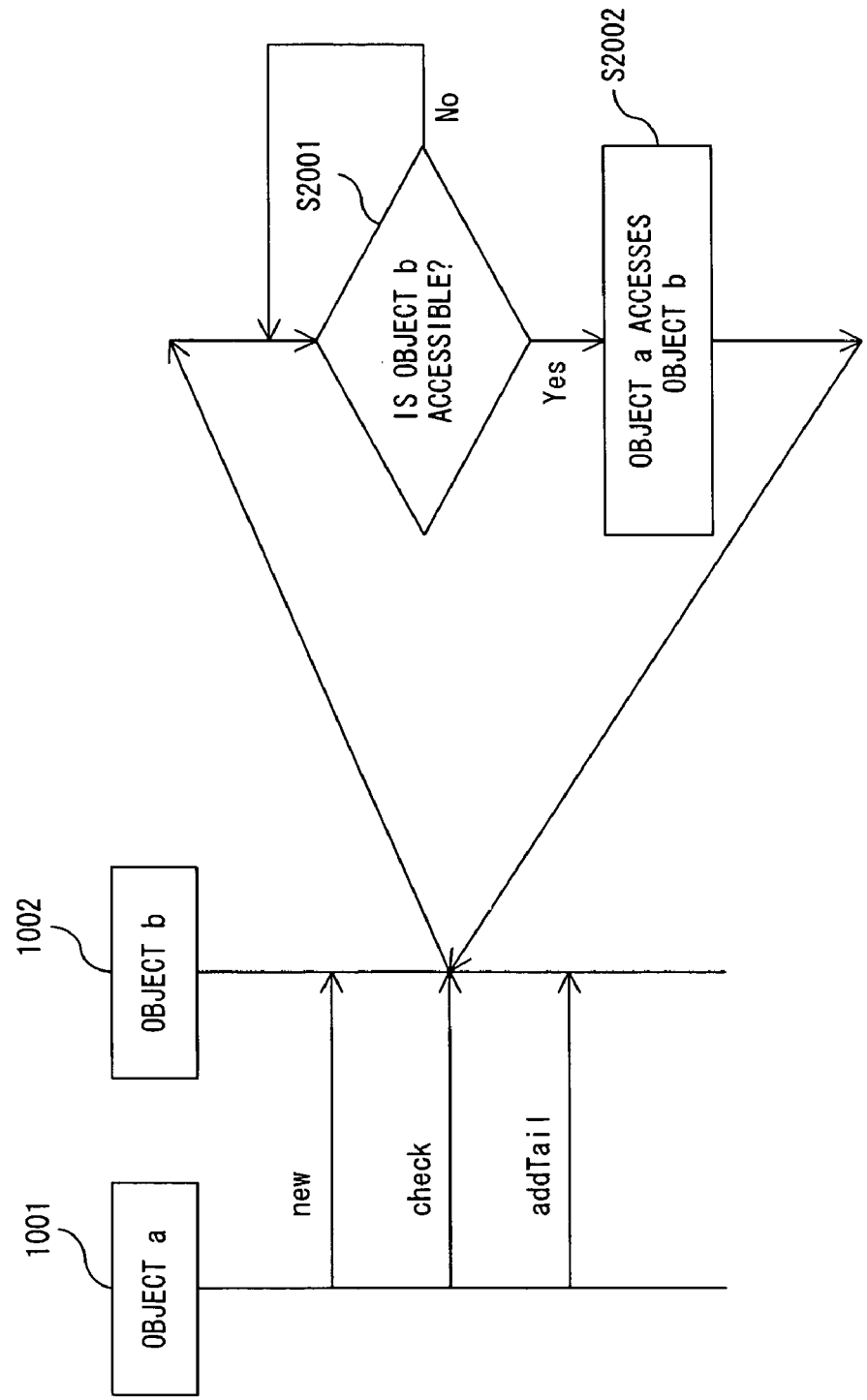
FIG. 1 shows the conventional procedure for avoiding competition.
Figure 2:
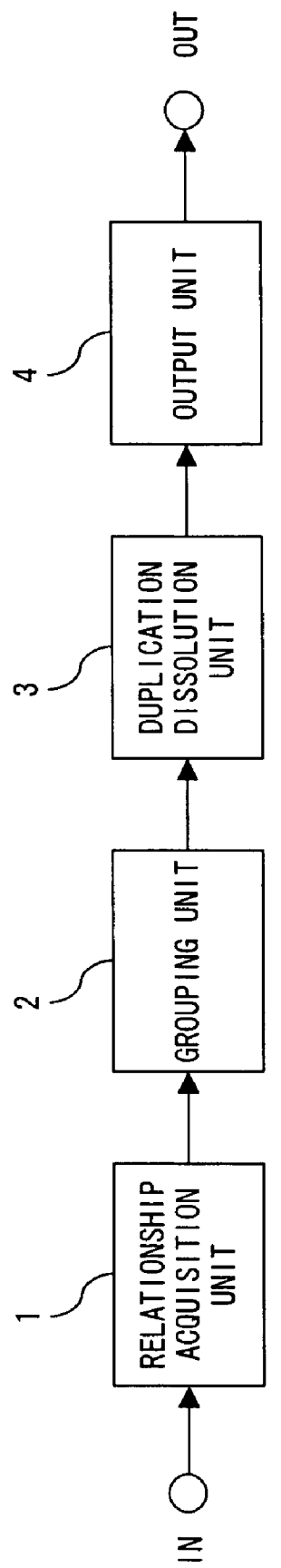
FIG. 2 shows the configuration of the principle of the present invention.

FIG. 2 shows the configuration of the principle of the present invention. FIG. 2 shows the functional-block division system embodying the present invention, and this system divides functions required for the system to be designed into functional blocks so that the functions may be constituted by a combination of a plurality of functional blocks.

In FIG. 2, 1 is a relationship acquisition unit; 2 is a grouping unit; 3 is a duplication dissolution unit; and 4 is an output unit.

The relationship acquisition unit 1 acquires the relationship between a plurality of sequences to be implemented to realize the functions required for the system to be designed and the object to and from which the sequences deliver and receive messages.

The grouping unit 2 groups the sequences which deliver and receive messages to and from the same object to make a group of sequences associated with the object based on the relationship between the sequences and the object acquired by the relationship acquisition unit 1.

The duplication dissolution unit 3 dissolves, when the same sequence belongs to a different group of sequences in duplication due to the grouping of sequences by the grouping unit 2, the duplication of the sequence based on the relationship, between the sequence and the other sequences which deliver and receive messages to and from the object to and from which the sequence delivers and receives messages, of the implementation order of the object which delivers and receives massages to and from the sequence.

The output unit 4 outputs the sequence belonging to the group of sequences associated with the functional blocks as a sequence to be implemented by the functional blocks which associates the group of sequences grouped by the grouping unit 2 including the sequence whose duplication has been dissolved by the duplication dissolution unit 3 with the functional blocks.

According to this configuration, since messages are delivered and received to and from the same object by the sequences belonging to the same functional block, the competition of sequences due to the delivery and receiving of the messages to and from the object does not occur merely by managing the implementation order of the sequences belonging to the same functional block.

When the same sequence belongs to a different group of sequences in duplication, the duplication dissolution unit 3 dissolves the duplication of the sequence based on the relationship, between the sequence and the other sequences which deliver and receive messages to and from the object to and from which the sequence delivers and receives messages, of the implementation order of the object. For example, when the sequence belongs to the group which must be implemented in the order other than the first order, the duplication dissolution unit 3 makes the sequence belong only to that group and dissolves its belonging to other groups. Thus, by managing the implementation order of each functional block, the sequence and the other sequence belonging to the group of sequences in which the belonging of the sequence has been dissolved do not deliver and receive messages to and from the same object at the same time, so that the competition of sequences due to the delivery and receiving of messages to and from this object can be avoided.

In the configuration shown in FIG. 2, it is possible that the grouping unit 2 groups a group under the exclusion of the object to and from which all the plurality of sequences, which are implemented to realize the functions required for the system to be designed, deliver and receive messages from the grouping standard.

Since the competition of sequences occurring when messages are delivered and received to and from such an object cannot be avoided by the grouping method of the present invention, the processing load required for the grouping unit 2 to make a group of sequences and for the duplication dissolution unit 3 to solve the duplication of a sequence can be reduced by excluding the object from the grouping standard as described above.

In the configuration shown in FIG. 2, it is also possible that the grouping unit 2 groups a group under the exclusion of the object to and from which only one of a plurality of sequences, which are implemented to realize the functions required for a system to be designed, delivers and receives messages from the grouping standard.

If the sequence which delivers and receives messages to and from such an object is only one sequence, the competition of sequences due to this delivery and receiving of messages does not occur at all, so that the processing load required for the grouping unit 2 to make a group of sequences is reduced by excluding this object from the grouping standard as described above.

In the configuration shown in FIG. 2, it is also possible that the grouping unit 2 groups a group under the exclusion of the object in which no data is written in delivering and receiving messages by any of the plurality of sequences, which are implemented to realize the functions required for the system to be designed, from the grouping standard.

When the competition of sequences occurs due to the delivery and receiving of messages to and from such an object, if no data is written in all the delivery and receiving of messages to and from this object, for example, in the case of only reading-out, it does not badly affect the implementation of each sequence. So, the processing load required for the grouping unit 2 to make a group of sequences and for the duplication dissolution unit 3 to dissolve the duplication of a sequence is reduced by excluding this object from the grouping standard as described above.

In the configuration shown in FIG. 2, it is also possible to provide an implementation order determination unit for determining the implementation order of each sequence which belongs to the group made by the grouping unit 2 based on the relationship of the implementation order of the object with which the group is associated and to make the output unit 4 output the sequence belonging to the group associated with a functional block and the information indicating the implementation order in the group of the sequence.

By so doing, it is also possible to present not only the kind of the sequence to be implemented in each functional block but also the implementation order for avoiding the competition among the sequences as the output of the system.

In the configuration shown in FIG. 2, it is also possible to make the relationship acquisition unit 1 acquire the relationship between a plurality of sequences to be implemented to realize the functions and the object to and from which the sequences deliver and receive messages based on the information acquired from the scenario whose action contents for realizing the use case in which the contents of the functions required for the system to be designed are indicated are described.

Thus, it is possible to make this system divide its functions into functional blocks by inputting the scenario whose action contents for realizing the use case in which the contents of the functions required for the system to be designed are indicated are described to the system related to the present invention.

In the configuration shown in FIG. 2, it is also possible to further provide a sequence integration unit for integrating, when a plurality of sequences which belong to other groups different from the group made by the grouping unit 2 in duplication belong to the group made by the grouping unit 2, the plurality of sequences into one sequence and making the integrated sequence belong to the group, and it is possible for the duplication dissolution unit 3 to dissolve the duplication of the sequence which includes the one integrated by the sequence integration unit.

When a plurality of sequences which belong to other groups different from the group made by the grouping unit 2 belong to the group of sequences grouped by the grouping unit 2 in duplication, it is probable that the duplication dissolution unit 3 cannot avoid the competition of sequences even if the unit tries to dissolve the duplication. In this case, the sequences which make the object common to the sequences belonging to the other groups an object of access are integrated into one sequence, and the duplication dissolution unit 3 dissolves the duplication of the sequences including the integrated sequence to avoid the competition of sequences.

In the configuration shown in FIG. 2, it is also possible to further provide a sequence implementation time acquisition unit for acquiring the information indicating the implementation time required to implement the sequence in the system to be designed in regard to each of a plurality of sequences to be implemented to realize the functions required for the system to be designed and a functional block implementation time acquisition unit for acquiring the implementation time required to implement the sequence to be implemented as the functional block in the system to be designed by calculating the sum total of the implementation time of each sequence outputted as the sequence to be implemented in the functional block by the output unit 4.

Thus, it can be judged from the processing results obtained by the system related to the present invention whether the requirements for the performance of the system to be designed in terms of the time can be satisfied or not.

In the configuration shown in FIG. 2, it is also possible to further provide a sequence consumption memory capacity acquisition unit for acquiring the information indicating the memory capacity required to implement, in the system to be designed, each of a plurality of sequences whose implementation is required to realize the functions required for the system to be designed and a functional block consumption memory capacity acquisition unit for acquiring the memory capacity required to implement the sequence to be implemented as the functional block in the system to be designed by calculating the sum total of the memory capacity for each sequence outputted by the output unit 4 as the sequence to be implemented in the functional block.

Thus, it can be judged from the processing results obtained by the system related to the present invention whether the requirements for the memory capacity of the system to be designed can be satisfied or not.

In order to divide functions required for the system to be designed into functional blocks so that the functions may be constituted by a combination of a plurality of functional blocks, the functional block division method is also related to the present invention, which dissolves the duplication of the sequence based on the relationship of implementation order concerning the object between the sequence and other sequences which deliver and receive messages to and from the object to and from which the sequence delivers and receives messages, associates the group with the functional block, and outputs the sequence belonging to the group associated with the functional block as the sequence to be implemented in the functional block, when the relationship between a plurality of sequences to be implemented to realize the functions and the object to and from which the sequences deliver and receive messages is acquired, and the sequences which deliver and receive messages to and from the same object are grouped to make a group associated with the object, and the same sequence belongs to a different group in duplication owing to the grouping. Thus, the same operation and effect as those of the functional block division system related to the present invention shown in FIG. 2 can be accomplished and the above-mentioned problems can be solved.

Also, the same operation and effect as those of the functional block division method related to the present invention shown in FIG. 2 can be accomplished and the above-mentioned problems can be solved by directing a computer to read and execute the program in which instructions which direct the computer to execute the processing corresponding to the functional block division method related to the present invention are written.

Described below is a concrete embodiment of the present invention. Described here in this embodiment is the instance in which the present invention is implemented in designing a system which transmits data from MAC (Media Access Control) to PMD (Physical-layer Medium Dependent) which are both used for transmission technology based on an FDDI (Fiber-Distributed Data Interface) which is one of the standards of a LAN (Local Area Network).

In the following description, the system to be designed is supposed to be designed using a system development method using a UML (Unified Modeling Language) which is widely known in the field of object-oriented software development.

[1. Extraction of Functions]

In designing a system, first of all, functions required for the system to be designed are extracted. In the system design using a UML, the results of the extraction of functions are indicated by a use case drawing. The use case drawing of the whole system which is made for the system to be designed is shown in FIG. 3.

Figure 3:
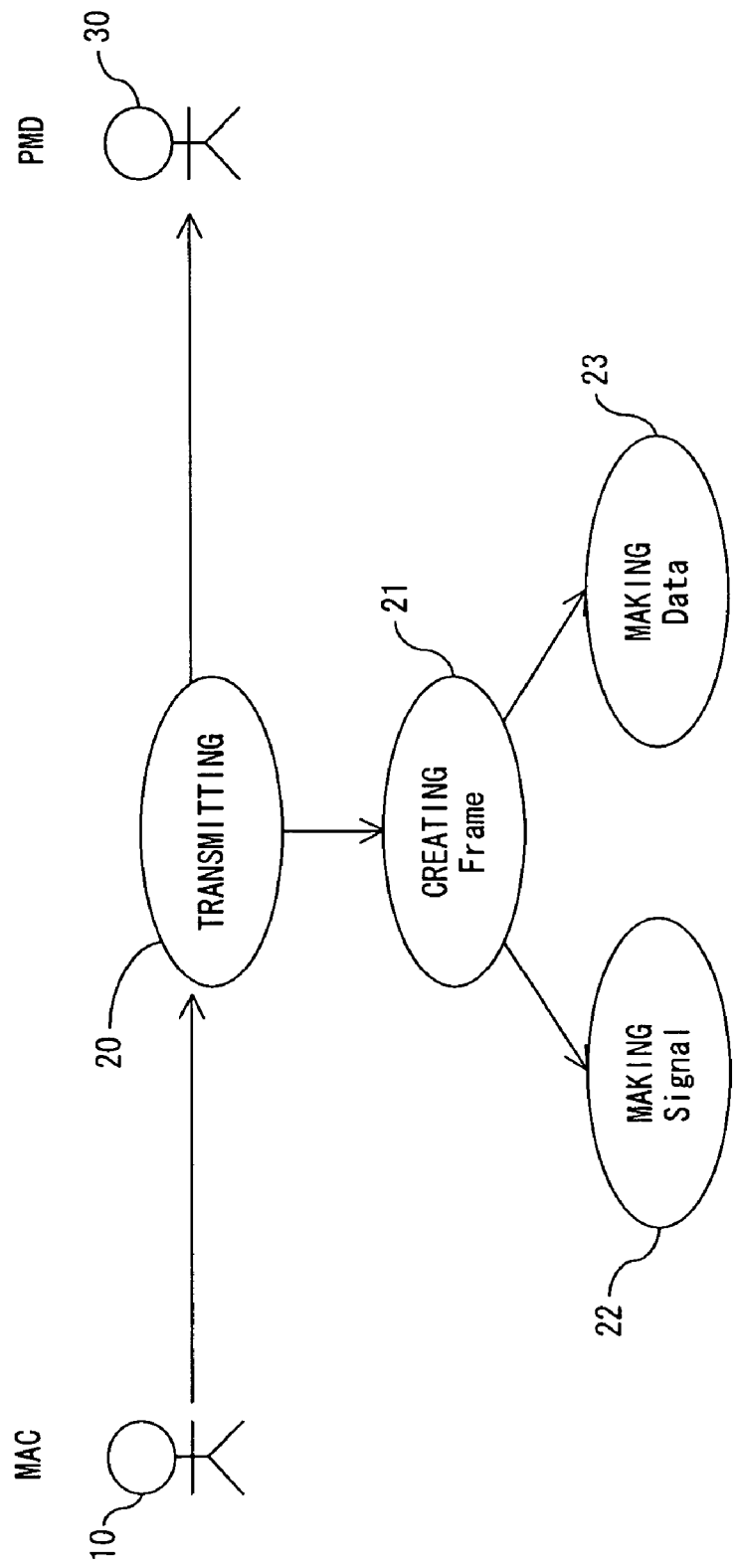
FIG. 3 shows the use case of the whole system which is made for the system to be designed.

10 and 30 in FIG. 3 are icons indicating an actor. The actor means what exists outside of the system to be designed and interacts with the system to be designed. The actor is indicated by an icon which is human being-shaped as shown in FIG. 3, but the actor, not limited to a human being, can be other systems which communicate with the system to be designed. In fact, in the system to be designed shown in FIG. 3, the actor 10 indicates MAC, and the actor 30 indicates PMD.

In FIG. 3, 20 is the icon indicating a use case. The use case means what the cooperative action between the object constituting the system to be designed and the actor is abstracted. In the system to be designed shown in FIG. 3, the use case 20 indicates the action of "transmitting."

The arrow from the actor 10 to the use case 20 and the arrow from the use case 20 to the actor 30 indicate the relationship between the actors 10 and 30 and the use case 20. In FIG. 3, the function of the system to be designed of "transmitting from MAC to PMD" is shown by the actor 10, actor 30, use case 20 and these arrows.

[2. Making of Scenario and Detailing of Use Case]

Next, a scenario is made based on the use case drawing made in [1.] above. The scenario means sentences which explain in detail the concrete contents of action to be taken to realize the cooperative action shown by the use case.

Concerning the use case 20 of "transmitting" shown in FIG. 3, for example, sentences stating, "A frame is made, and a signal and data which are stored in the frame are made, and then the frame is transmitted" are made as the scenario. The "signal" means a control code to be added to the transmission data from MAC to PMD, and the "data" means a material data transmitted from MAC to PMD.

Since a plurality of methods for realizing the cooperative action indicated by the use case sometimes exist, a different scenario is sometimes made from the same use case. In other words, a scenario which is made for the same use case is not determined to be a unique scenario. Therefore, any scenario described as the one which is made from each use case in this specification is merely an example.

When the scenario has been made, the original use case is detailed based on the scenario, and a use case drawing indicating the detailed use case is made.

Detailing the use case is performed by extracting verbs used in the scenario. In the example used in the above-mentioned scenario, the action of "creating a frame" is necessary to implement the action of "transmitting" which is the use case 20, and the action of "making a signal" and the action of "making data" are necessary to implement the action of "creating the frame." In other words, the use case of "creating a frame" is necessary to implement the action of "transmitting" which is the use case 20, and two use cases of "making a signal" and "making data" are necessary to implement the action of "creating a frame." In FIG. 3, these three use cases obtained by detailing the use case 20 are shown as 21, 22 and 23.

After then, making scenarios for the detailed use cases and detailing the use cases are carried out repeatedly.

Described here in this part is the procedure for making a scenario for the use case 23 of "making data" and detailing the use case among the detailed use cases shown in FIG. 3.

Figure 4:
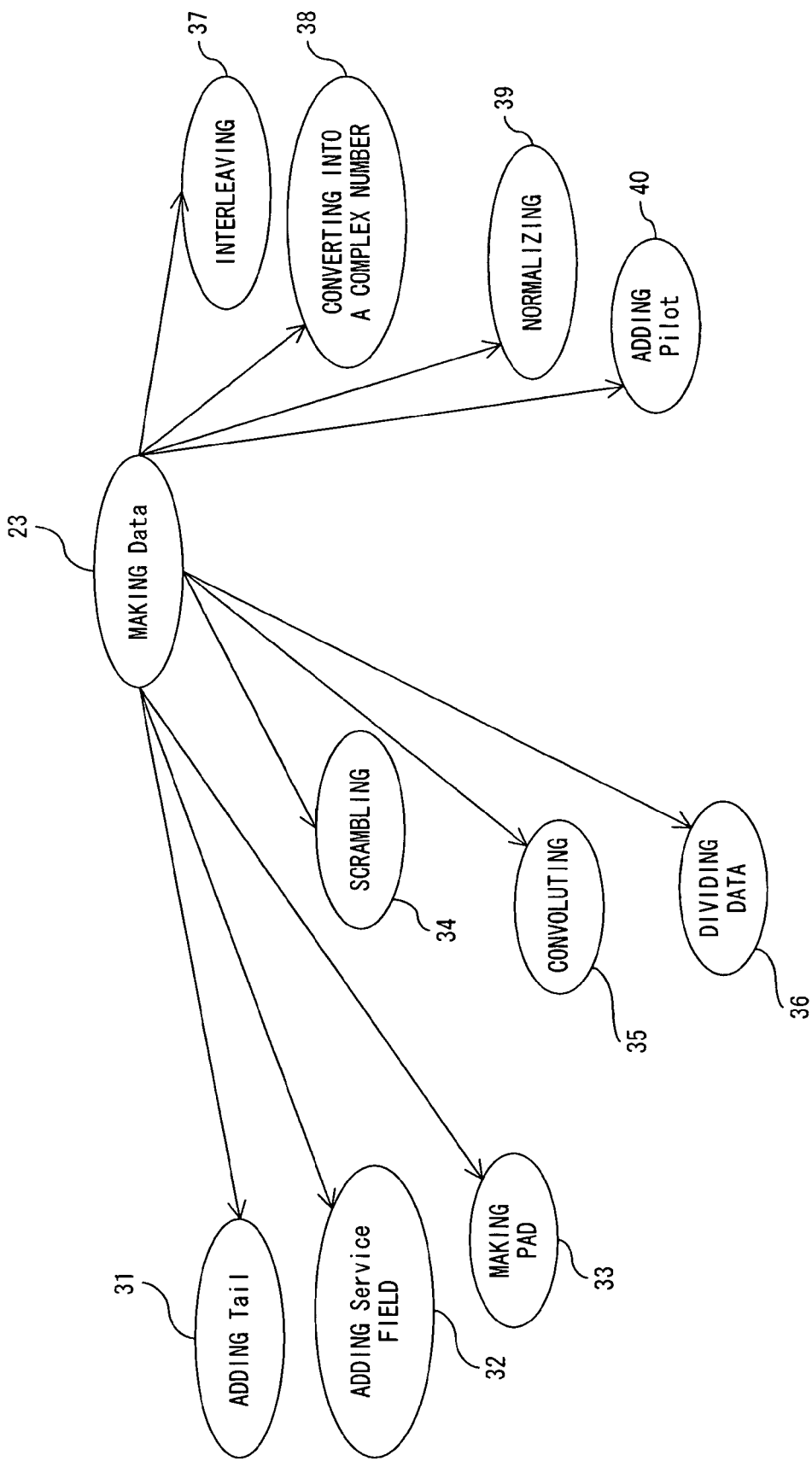
FIG. 4 shows the use case in which the use case of "making data" shown in FIG. 3 is further detailed.

Concerning the use case 23 of "making data," a scenario is made in which, for example, "Tail and Service Fields are added; a PAD is made; these are scrambled and convoluted; data is divided, interleaved; converted into a complex number; normalized; and a pilot is added to make data." Then, from this scenario, the use case 23 of "making data" is detailed into "Tail is added," "Service Field is added," "PAD is made," "theses are scrambled," "these are convoluted," "data is divided," "data is interleaved," "data is converted into a complex number," "data is normalized" and "Pilot is added." The drawing of these detailed use cases is shown in FIG. 4.

Next, a scenario is further made for these use cases.

Concerning the use case 31 of "adding Tail," a scenario is made in which, for example, "the Rate Table is referred to; a Data area is made based on the reference results; and Tail data is added to the data existing in the area which is the target to be transmitted."

Concerning the use case 32 of "Service Field is added," a scenario is made in which, for example, "Service Field is added to the data of a Data area."

Concerning the use case 33 of "making a PAD," a scenario is made in which, for example, "the Rated Table is referred to; the number of PADs is calculated based on the reference results; and "0" data of the number corresponding to the number of the PADs is added to the data of the Data area." PAD means a padding bit in a MAC frame.

Concerning the use case 34 of "scrambling," a scenario is made in which, for example, "scrambler is initialized, and data is scrambled."

Concerning the use case 35 of "convoluting," a scenario is made in which, for example, "the encoder is initialized; data is encoded; a coded Data area corresponding to the data is made; the rated table is referred to; and the picture (convolution) of the coded data stored in the coded Data area is calculated."

Concerning the use case 36 of "dividing data," a scenario is made in which, for example, "the coded data is divided; the Rate Table is referred to; a Divided Data area corresponding to the coded data is made; and the Divided Data stored in the Divided Data area is divided."

Concerning the use case 37 of "interleaving data," a scenario is made in which, for example, "the Divided Data is interleaved with reference to the Rate Table."

Concerning the use case 38 of "converting Divided Data into a complex number," a scenario is made in which, for example, "a complexed Data area is made based on the Divided Data; a complex number corresponding to the Divided Data is made with reference to the Rate Table; a real part and an imaginary part of the complex number are taken out; they are added to the complexed Data area; and then, the Divided Data is converted into a complex number."

Concerning the use case 39 of "normalizing data," a scenario is made in which, for example, "complexed data is normalized with reference to the Rate Table."

Concerning the use case 40 of "adding Pilot," a scenario is made in which, for example, "a Pilot area is made; and Pilot data is added to the complexed data."

[3. Clarification of Logical Structure]

An object which is the target for the cooperative action shown by each use case is extracted from the scenario which is detailed in [2.] above for each use case, and a class drawing showing a class, in which the extracted object is abstracted, and the relationship between each class is made to clarify a logical structure.

The extraction of the object from the scenario is implemented by extracting nouns used in the scenario.

For example, from the scenario concerning the use case 20 of "transmitting," stating, "A frame is made; signals and data to be stored in the frame are made; and the frame is transmitted" among the scenarios made in the above descriptions, three nouns of "frame," "signal" and "data" are extracted as the objects, and a frame class, a signal class and a data class in which these nouns have been abstracted are drawn in a class drawing.

From the contents of the scenario, it is known that the Frame object is interrelated to the signal object, and the Frame object is interrelated to the Data object. Thus, the frame class, signal class and data class in the class drawing are connected by various kinds of lines which are selected based on such relationships.

Figure 5:
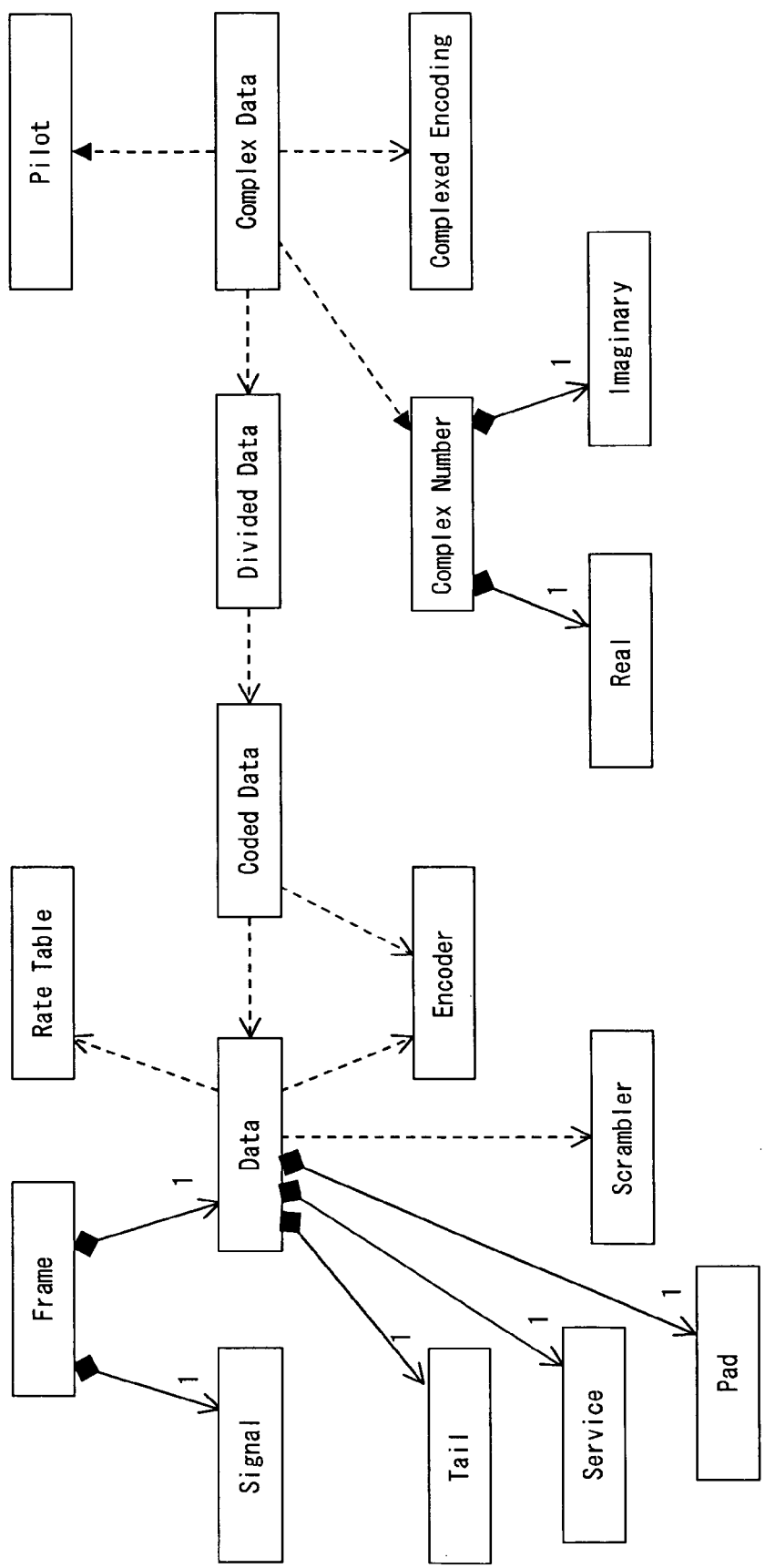
FIG. 5 is a class diagram made based on the scenario which is made for the use case shown in FIG. 3 and FIG. 4.

Shown in FIG. 5 is the class drawing made based on the scenario which is made for each use case shown in FIG. 3 and FIG. 4.

All the relationships between each class shown by the class drawing shown in FIG. 5 cannot be drawn based on only the scenario which has already been made, so part of the relationships drawn is drawn based on technical common knowledge.

[4. Making of Action Flow]

Next, a sequence drawing indicating the sequence implemented to realize the action of each use case and the procedure for implementing that sequence is made.

Shown in FIG. 6 is the sequence diagram of the whole system which is made for the system to be designed. FIG. 6 is the diagram corresponding to the use case drawing of the whole system to be designed shown in FIG. 3.

The sequences shown in FIG. 6 are described in the order of implementation as follows.

First, a MAC actor 10 issues a new message 101, and the sequence which generates a Layer object 50 is implemented.

Then, the MAC actor 10 issues a receive Request message 102, and the sequence which sends the receive request from the MAC actor 10 to the Layer-object 50 is implemented.

Then, the MAC actor 10 issues a receive Data message 103, and the sequence which sends data which is the target for transmission from the MAC actor 10 to the Layer object 50 is implemented.

Then, the Layer object 50 issues a new message 104, and the sequence which creates a Frame object 60 is implemented.

The Frame object 60 issues a make Signal message 105, and the sequence which creates data is implemented. This sequence is the one which realizes the action corresponding to the use case 23 of "creating data" shown in FIG. 3.

Then, the Frame object 60 issues a make Signal message 106, and the sequence which makes data is implemented. This sequence is the one which realizes the action corresponding to the use case 22 of "creating a signal" shown in FIG. 3.

Then, the Layer object 50 issues a receive message 107, and the sequence which sends the frame composed of the signal and data made by the sequences which have been implemented by then to a PMD actor 30 from the Layer object 50 is implemented.

Then, the Layer object 50 issues notify End messages 108 and 109, and the sequence which notifies the end of the action to the PMD actor 30 and the MAC actor 10 is implemented.

All the above sequences are shown in FIG. 6.

Figure 7:
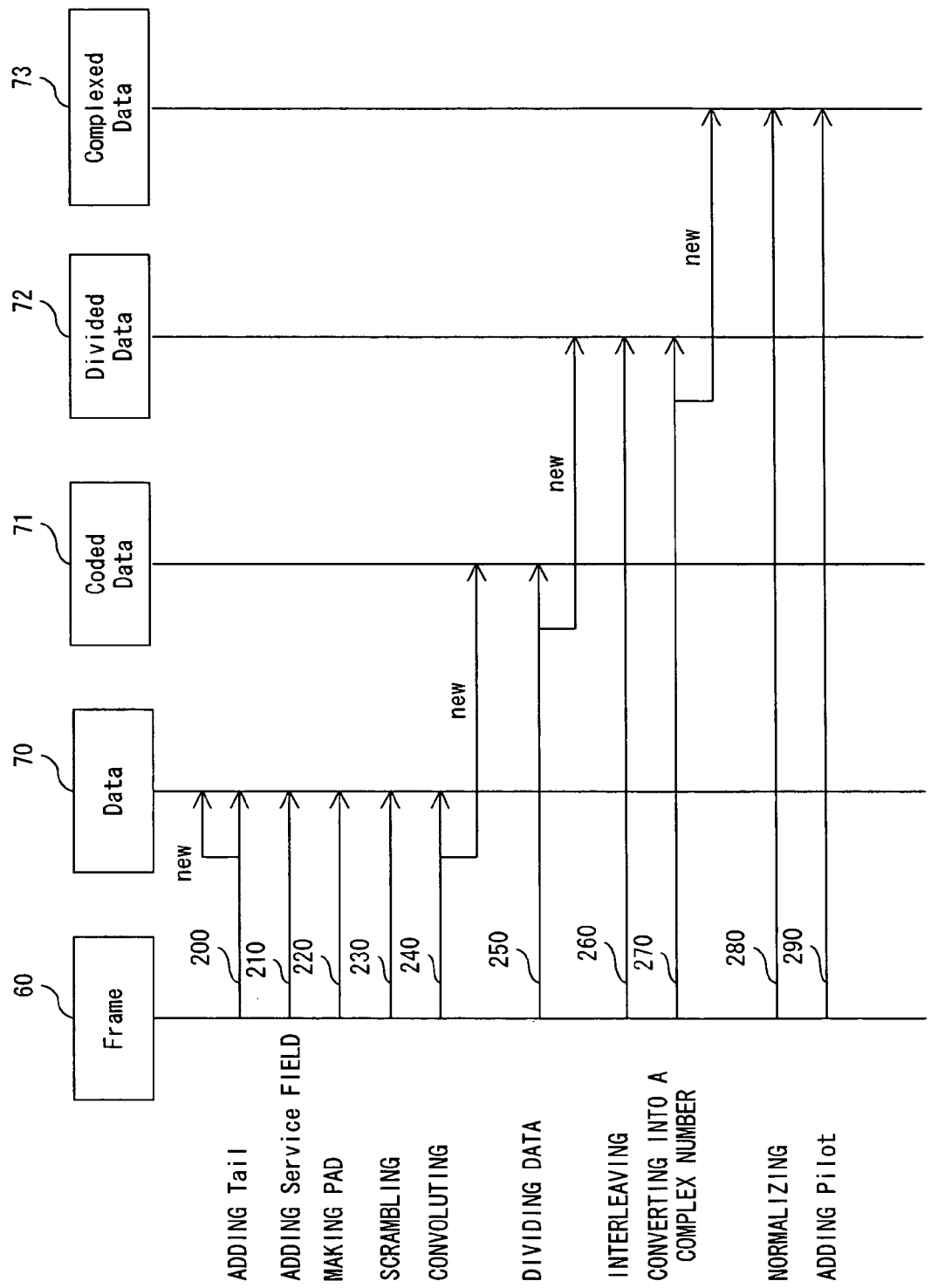
FIG. 7 shows the sequence which further details the sequence of making the data to be implemented by issuing a "make Data message" among the sequences shown in FIG. 3.

Next, FIG. 7 is described below. FIG. 7 is the diagram which shows, in further detail, the sequence of making data which is implemented by the issuance of a make data message 105 among the sequences shown in FIG. 3, and corresponds to the drawing of the use case which details the use case 23 of "making data" shown in FIG. 4.

The sequences shown in FIG. 7 are described in the order of implementation as follows.

First, a sequence 200 of "adding Tail" which realizes the action corresponding to the use case 31 of "adding Tail," a sequence 210 of "adding Service Field" which realizes the action corresponding to the use case 32 of "adding Service Field," a sequence 220 of "making PAD" which realizes the action corresponding to the use case 33 of "making PAD," and a sequence 230 of "scrambling" which realizes the action corresponding to the use case 34 of "scrambling" are implemented in this order between a Frame object 60 and a Data object 70.

Then, a sequence 240 of "convoluting" which realizes the action corresponding to the use case 35 of "convoluting" is implemented between the Frame object 60, the Data object 70 and the Coded Data object 71.

Then, a sequence 250 of "dividing data" which realizes the action corresponding to the use case 36 of "dividing data" is implemented between the Frame object 60, the Coded Data object 71 and the Divided Data object 72.

Then, a sequence 260 of "providing interleaving" which realizes the action corresponding to the use case of 37 of "providing interleaving" is implemented between the Frame object 60 and the Divided Data object 72.

Then, a sequence 270 of "converting into a complex number" which realizes the action corresponding to the use case 38 of "converting into a complex number" is implemented between the Frame object 60, the Divided Data object 72 and the Complexed Data object 73.

Then, a sequence 280 of "normalizing" which realizes the action corresponding to the use case 39 of "normalizing" is implemented between the Frame object 60 and the Complexed Data object 73.

Then, a sequence 290 of "adding Pilot" which realizes the action corresponding to the use case 40 of "adding Pilot" is implemented between the Frame object 60 and the Complexed Data object 73.

All the above sequences are shown in FIG. 7.

Diagrams indicating the details of each sequence shown in FIG. 7 are shown in FIG. 8 to FIG. 17, and each sequence shown in each diagram is described in the order of implementation as follows.

Figure 8:
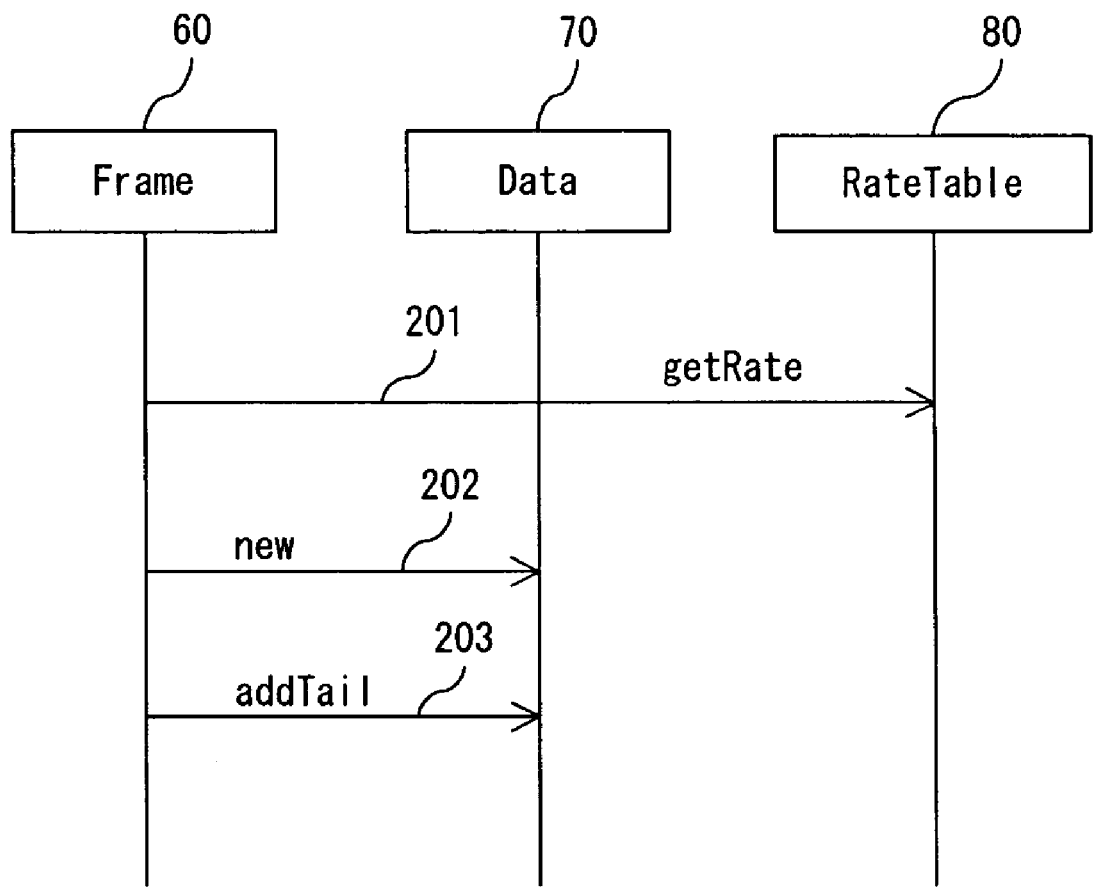
FIG. 8 shows the sequence which further details the sequence of "adding Tail" among the sequences shown in FIG. 7.

FIG. 8 is the sequence diagram which further details the sequence 200 of "adding Tail" among the sequences shown in FIG. 7.

First, the Frame object 60 issues a get Rate message 201, and the sequence which acquires the data having a Rate Table 80 is implemented.

Then, the Frame object 60 issues a new message 202, and the sequence which creates the Data object 70 is implemented.

Then, the Frame object 60 issues an add Tail message 203, and the sequence which adds Tail data to the data which is the target for transmission and which the Data object 70 has is implemented.

All the above sequences are shown in FIG. 8.

Figure 9:
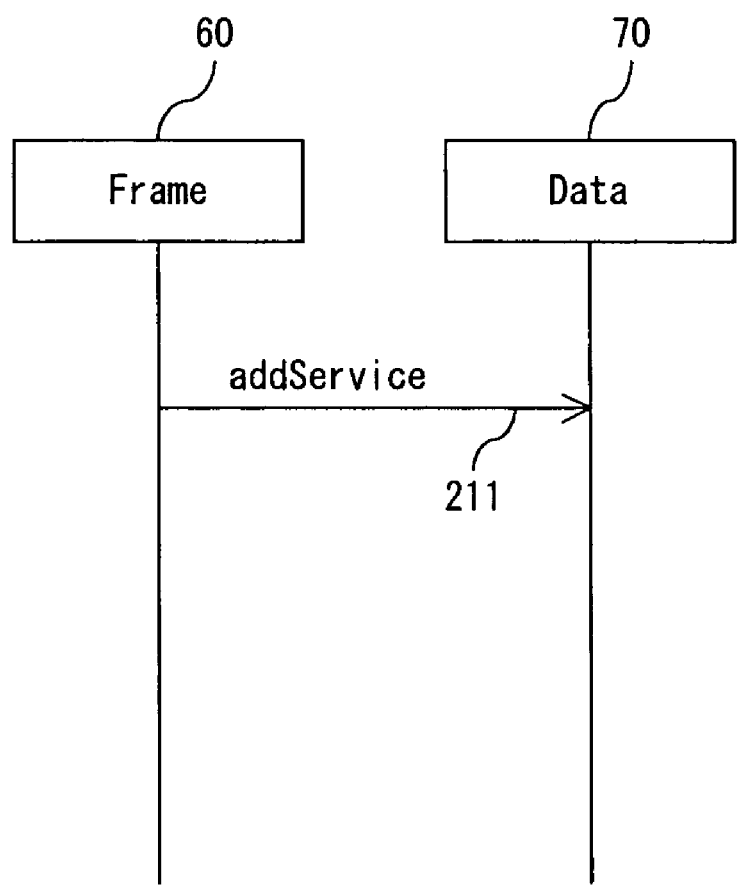
FIG. 9 shows the sequence which further details the sequence of "adding Service Field" among the sequences shown in FIG. 7.

FIG. 9 is the sequence diagram which further details the sequence 210 of "adding Service Field" among the sequences shown in FIG. 7.

In this sequence diagram, the Frame object 60 issues an add Service message 211, and the sequence which adds a Service Field to the data which is the target for transmission and which the Data object 70 has is implemented.

Figure 10:
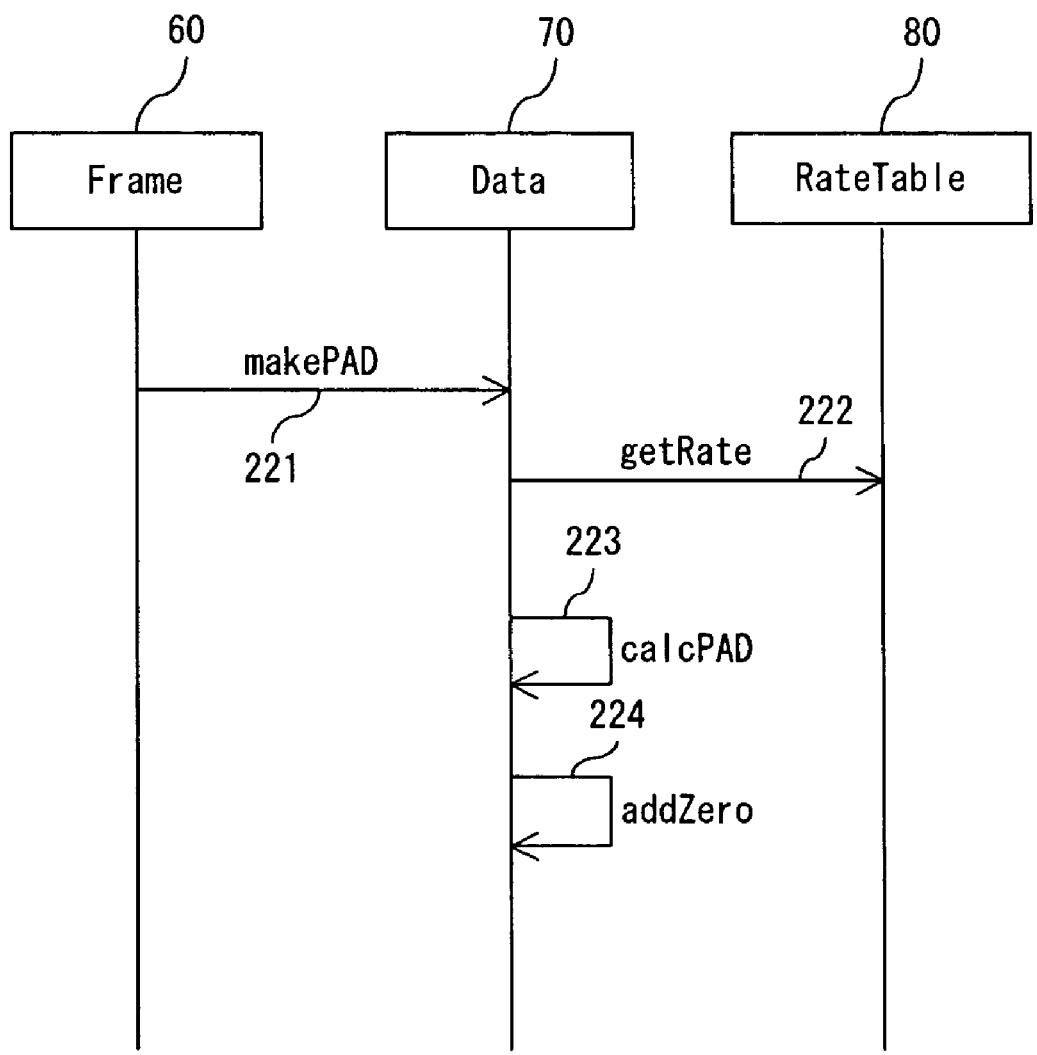
FIG. 10 shows the sequence which further details the sequence of "making PAD" among the sequences shown in FIG. 7.

FIG. 10 is the sequence diagram which further details the sequence 220 of "making PAD" among the sequences shown in FIG. 7.

First, the Frame object 60 issues a make Pad message 221, and the sequence which adds a PAD to the data which is the target for transmission and which the Data object 70 has is implemented.

Then, the Data object 70 issues a get Rate message 222 according to this make PAD message 221, and the sequence which acquires the data which the Data object 70 has is implemented.

Then, the Data object 70 issues a calc PAD message 223, and the sequence which calculates the number of PADs based on the data acquired from the Rate Table object 80 is implemented.

Then, the Data object 70 issues a calc Zero message 224, and adds "0" data of the number corresponding to the number of PADs calculated in the sequence immediately before to the data which is the target for transmission and which the Data object 70 has.

All the above sequences are shown in FIG. 10.

Figure 11:
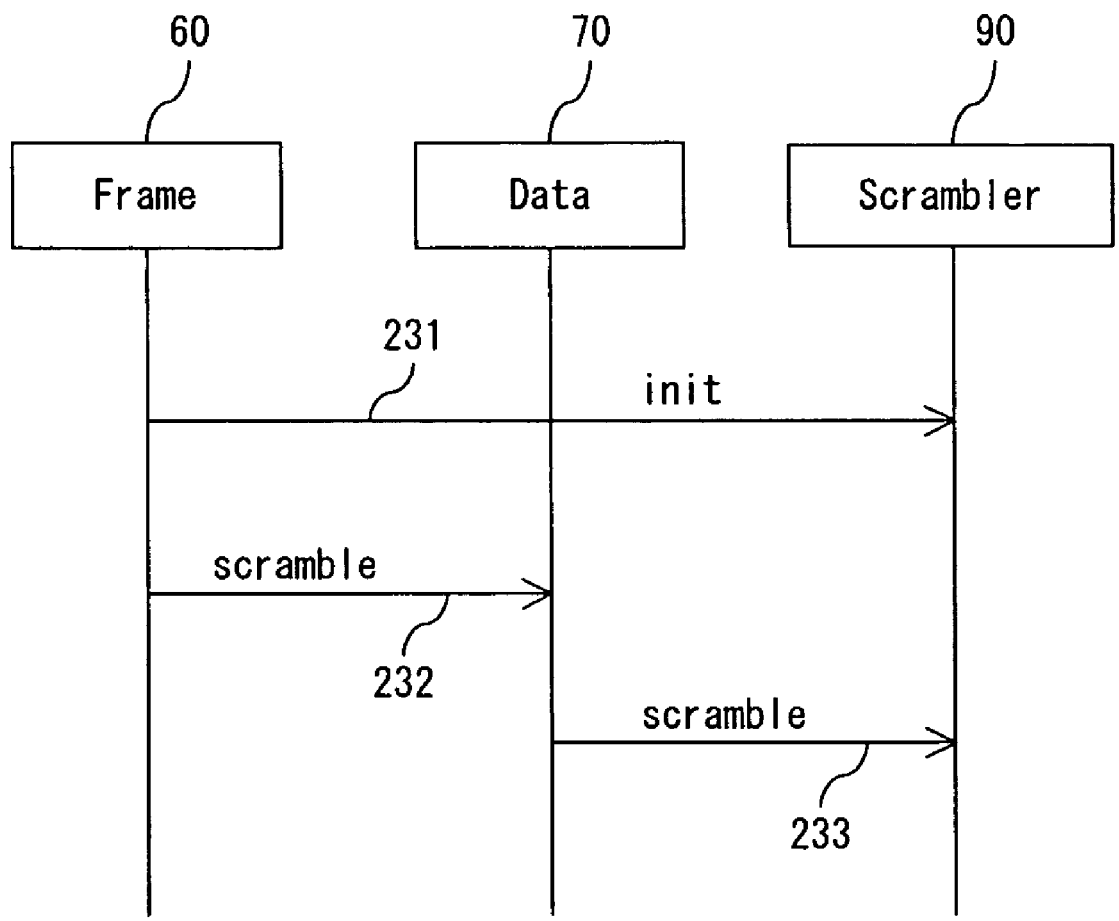
FIG. 11 shows the sequence which further details the sequence of "scrambling" among the sequences shown in FIG. 7.

FIG. 11 is the sequence diagram which further details the sequence 230 of "scrambling" among the sequences shown in FIG. 7.

First, the Frame object 60 issues an init message 232, and the sequence which initializes the Scramble object 90 is implemented.

Then, the Frame object 60 issues a scramble message 232, and the sequence which instructs the data which is the target for transmission and which the Data object 70 has to perform scrambling is implemented.

Then, the Data object 70 issues a scramble message 233 according to this scramble message 232, and the sequence which makes the Scrambler object 90 perform the scramble processing for the data which is the target for transmission and which the Data object 70 has is implemented.

All the above sequences are shown in FIG. 11.

Figure 12:
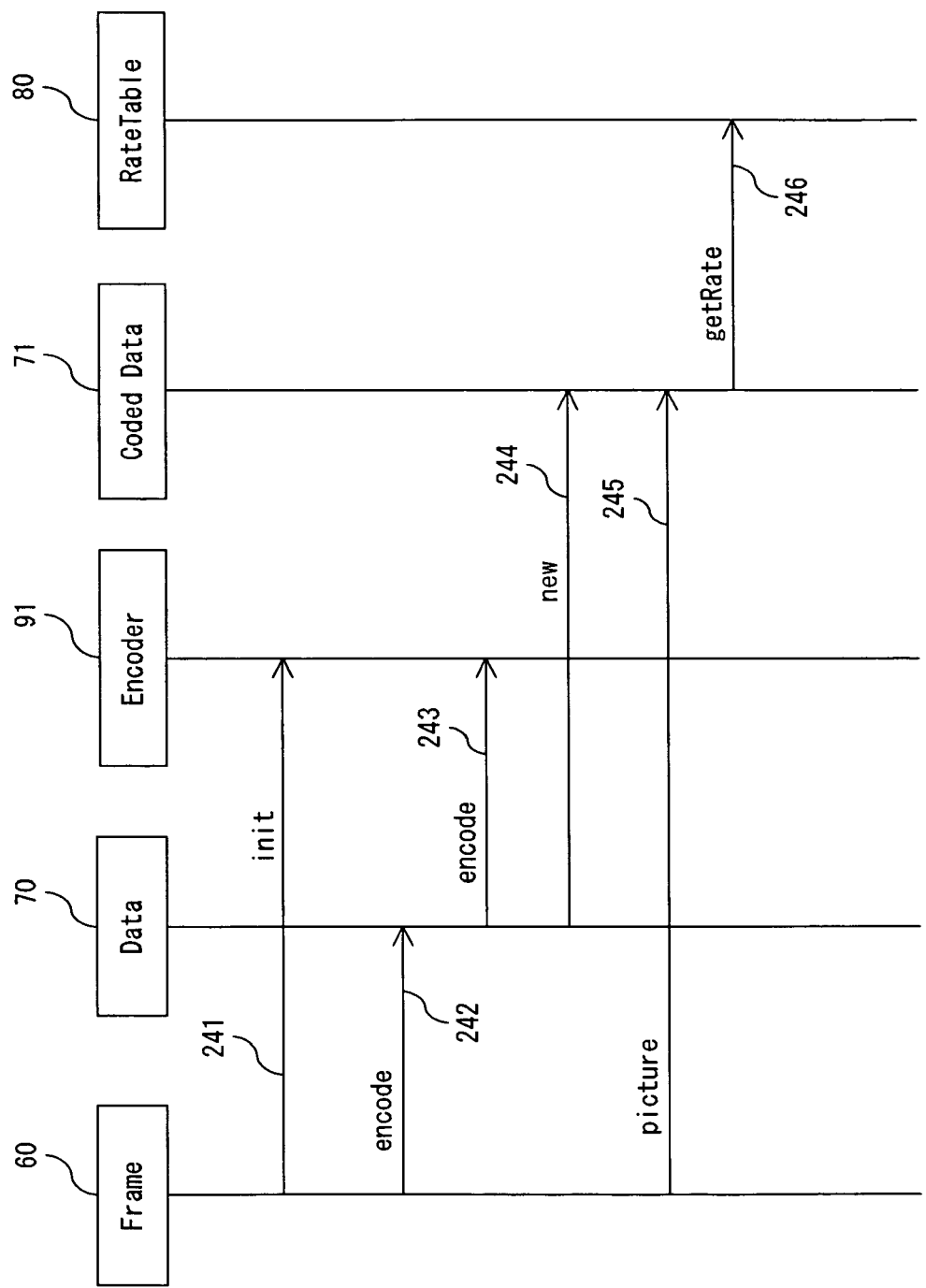
FIG. 12 shows the sequence which further details the sequence of "convoluting" among the sequences shown in FIG. 7.

FIG. 12 is the sequence diagram which further details the sequence 240 of "convoluting" among the sequences shown in FIG. 7.

First, the Frame object 60 issues an init message 241, and the sequence which initializes the encoder object 91 is implemented.

Then, the Frame object 60 issues an encode message 242, and the sequence which instructs the data which is the target for transmission and which the Data object 70 has to perform encode processing.

Then, the Data object 70 issues an encode message 243 according to the this encode message 242, and the sequence which makes the encoder object 91 perform encode processing for the data which is the target for transmission and which the Data object 70 has is implemented.

Then, the Data object 70 issues a new message 244, and the sequence which creates the Coded Data object 71 is implemented.

Then, the Frame object 60 issues a picture message 245, and the sequence which instructs the data which has been encoded by the encoder object 91 and which the Coded Data object 71 has to perform a convoluting calculation is implemented.

Then, the Coded Data object 71 issues a get Rate message 246 according to this picture message 245, and the sequence which acquires the data which is required for the convoluting calculation and which the Rate Table object 80 has is implemented.

All the above sequences are shown in FIG. 12.

Figure 13:
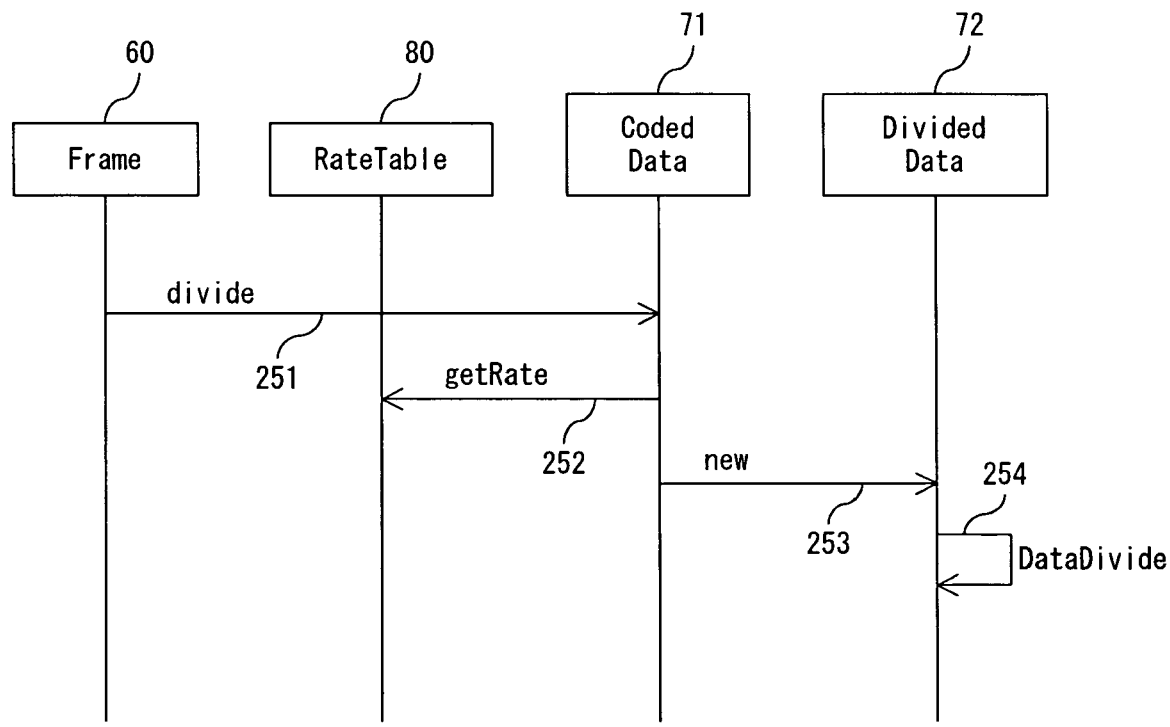
FIG. 13 shows the sequence which further details the sequence of "dividing data" among the sequences shown in FIG. 7.

FIG. 13 is the sequence diagram which further details the sequence 250 of "dividing data" among the sequences shown in FIG. 7.

First, the Frame object 60 issues a divide message 251, and the sequence which instructs to divide the coded data which is the data which has been convoluted and which the coded data 70 has is implemented.

Then, the Coded Data object 71 issues a get Rate message 252 according to this divide message 251, and the sequence which acquires the data required to divide data and which the Rate Table object 80 has is implemented.

Then, the Coded Data object 71 issues a new message 253, and the sequence which creates the Divided Data object 72 is implemented.

Then, the Divided Data object 72 issues a Data Divided message 254 according to this new message 253, and the sequence which divides the Coded Data is implemented.

All the above sequences are shown in FIG. 13.

FIG. 14 is the sequence diagram which further details the sequence 260 of "providing interleaving" among the sequences shown in FIG. 7.

First, the Frame object 60 issues an interleave message 261, and the sequence which instructs the Divided Data which has been divided and which the Divided Data object 72 has to process interleaving is implemented.

Then, the Divided Data object 72 issues a get Rate message 262 according to this interleave message 261, and the sequence which acquires the data which is required to process interleaving and which the Rate Table object 80 has is implemented.

All the above sequences are shown in FIG. 14.

Figure 15:
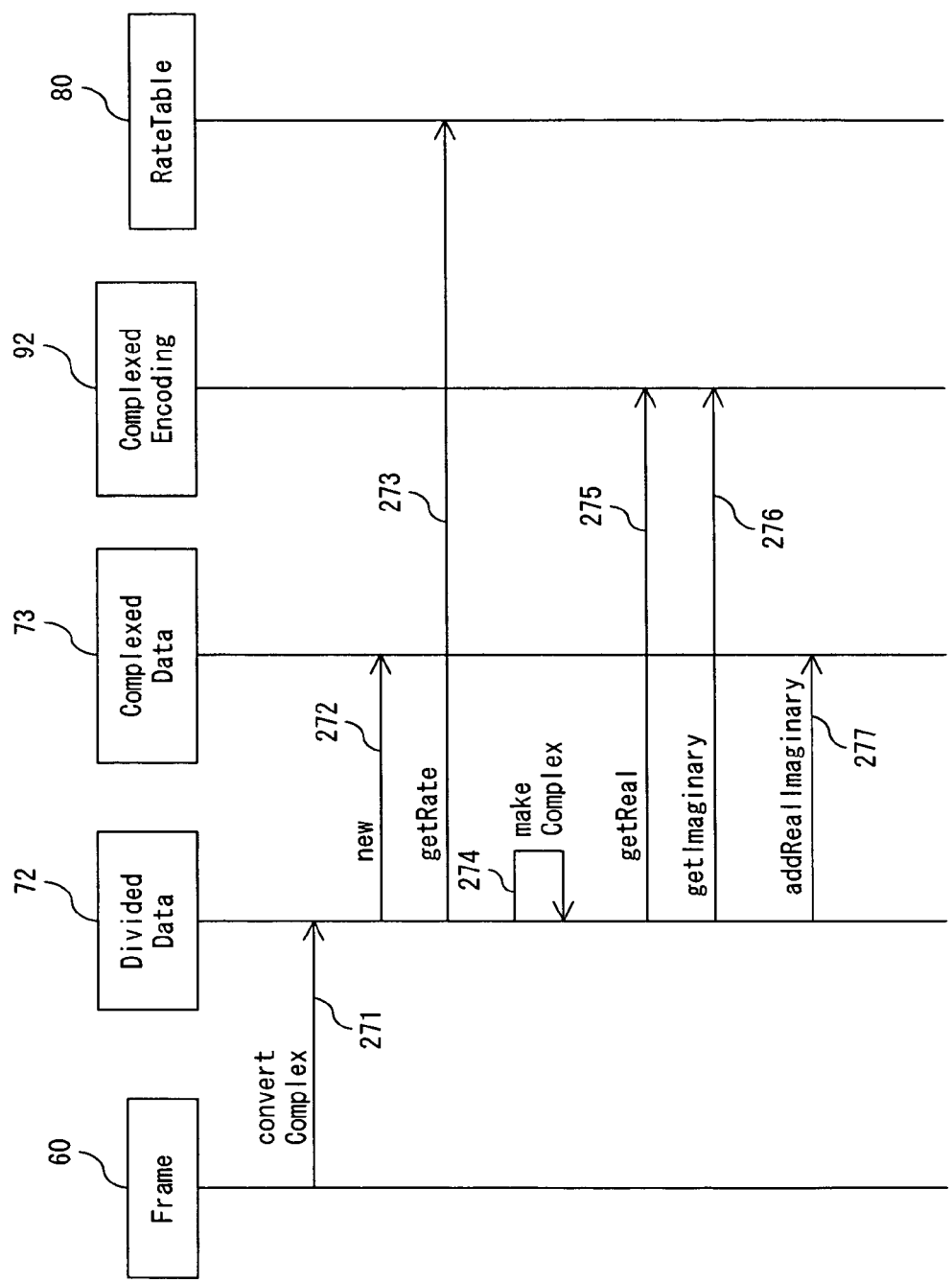
FIG. 15 shows the sequence which further details the sequence of "converting into a complex number" among the sequences shown in FIG. 7.

FIG. 15 is the sequence diagram which further details the sequence 270 of "converting into a complex number" among the sequences shown in FIG. 7.

First, the Frame object 60 issues a convert Complex message 271, and the sequence which instructs to convert the Divided Data which the Divided Data object 72 has and in which interleaving has been provided into a complex number is implemented.

Then, the Divided Data object 72 issues a new message 272 according to this convert Complex message 271, and the sequence which creates the Complexed Data object 73 is implemented.

Then, the Divided Data object 72 issues a get Rate message 273, and the sequence which acquires the data required to convert into a complex number and which the Rate Table object 80 has is implemented.

Then, the Divided Data object 72 issues a make Complex message 274, and the sequence which makes the Divided Data which the Divided Data object 72 has and in which interleaving has been provided start the process of converting into a complex number is implemented.

Then, the Divided Data object 72 issues a get Real message 275, and the sequence which acquires the real part of the Divide Data which the Complexed Encoding object 92 has and which has been converted into a complex number is implemented.

Then, the Divided Data object 72 issues a get Imaginary message 276, and the sequence which acquires the false part of the Divide Data which the Complexed Encoding object 92 has and which has been converted into a complex number is implemented.

Then, the Divided Data object 72 issues an add Real Imaginary message 277, and the sequence which adds a combination of the real part and false part of the Divide Data acquired to the Complexed Data object 73 as Complexed Data is implemented.

All the above sequences are shown in FIG. 15.

Figure 16:
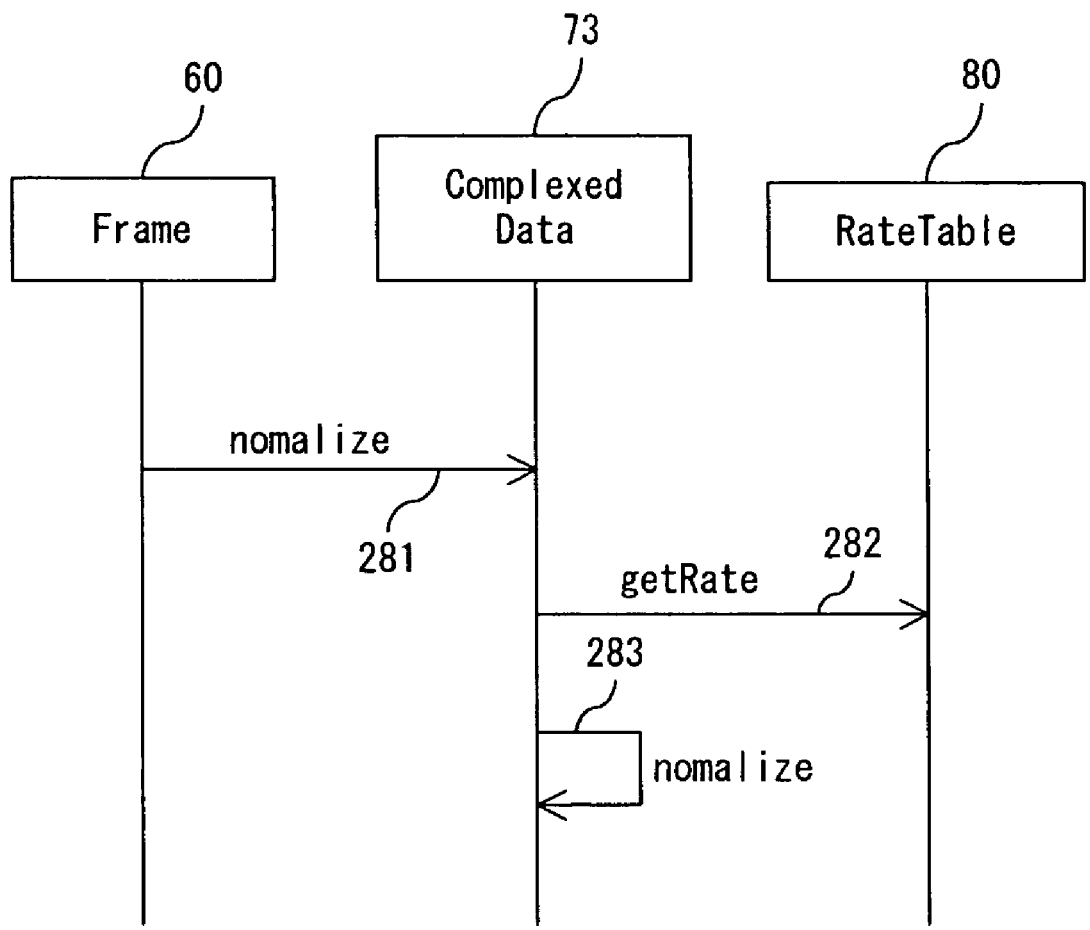
FIG. 16 shows the sequence which further details the sequence of "normalizing" among the sequences shown in FIG. 7.

FIG. 16 is the sequence diagram which further details the sequence 280 of "normalizing" among the sequences shown in FIG. 7.

First, the Frame object 60 issues a normalize message 281, and the sequence which instructs the Complexed Data which the Complexed Data object 73 has to process normalization is implemented.

Then, the Complexed Data object 73 issues a get Rate message 282 according to this normalize message 281, and the sequence which acquires the data which is required for the normalization processing and which the Rate Table object 80 has is implemented.

Then, the Complexed Data object 73 issues a normalize message 283, and the sequence which performs the process of normalizing the Complexed Data is implemented.

All the above sequences are shown in FIG. 16.

Figure 17:
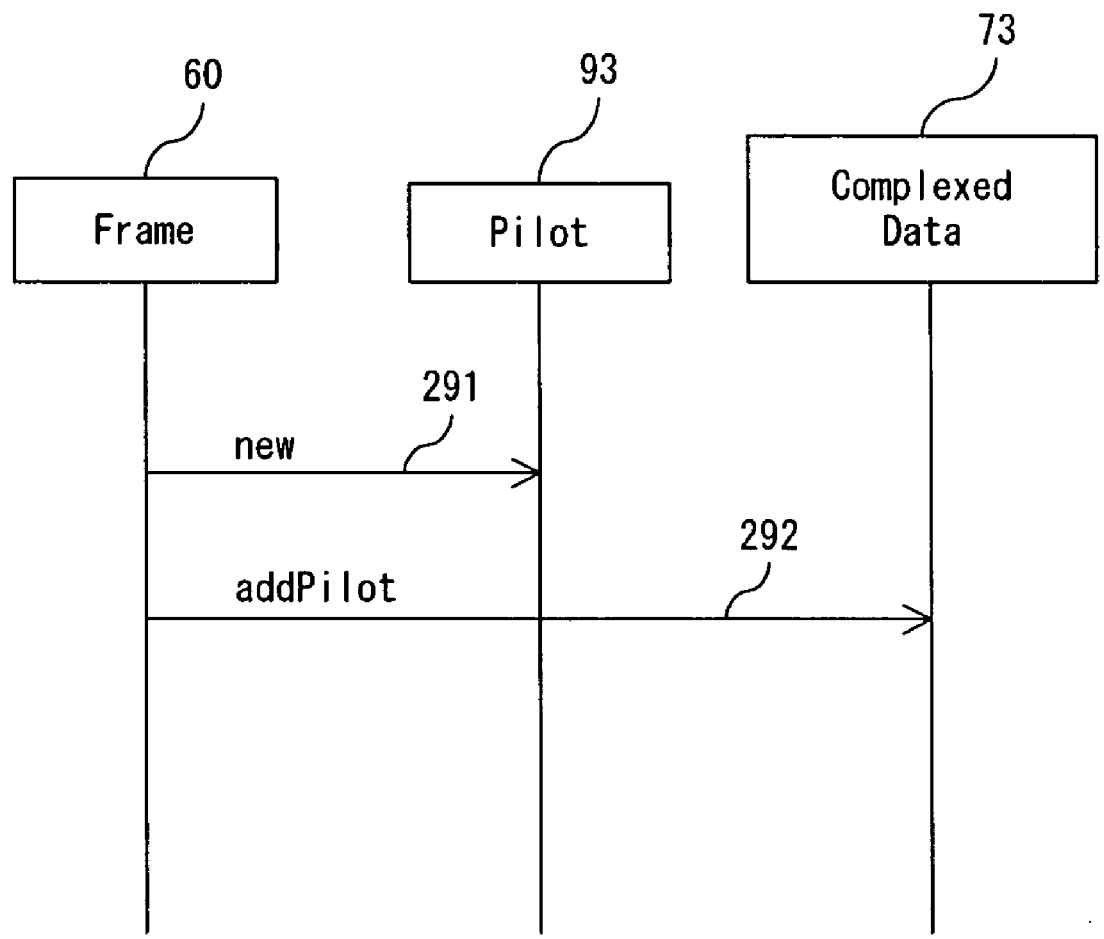
FIG. 17 shows the sequence which further details the sequence of "adding pilot" among the sequences shown in FIG. 7.

FIG. 17 is the sequence diagram which further details the sequence 290 of "adding Pilot" among the sequences shown in FIG. 7.

First, the Frame object 60 issues a new message 291, and the sequence which creates the Pilot object 93 is implemented.

Then, the Frame object 60 issues an add Pilot message 292, and the sequence which adds Pilot data to the normalized Complexed Data which the Complexed Data object 73 has is implemented.

All the above sequences are shown in FIG. 17.

All sequences necessary to satisfy the specifications required for the system to be designed are acquired by performing the operations described in [1.], [2.], [3.] and [4.] above.

[5. Grouping of Sequences]

Next, each sequence is grouped so that the occurrence of the competition of objects among the sequences in the functional blocks may be lessened when each sequence acquired by the operations is integrated into some functional blocks. Here, attention is paid to the fact that competition among sequences takes place due to the delivery and receiving of a different message to and from the same object, and grouping of sequences which lessens the occurrence of the competition of objects among sequences is realized by grouping the sequences on the basis of the difference of the objects to and from which a message is delivered and received in each sequence.

Described below is the grouping of the sequences required for the action of "making Data" among the contents of actions detailing the transmission action which is the specification required for the system to be designed and which has been explained above.

[5.1 Arrangement of Relationship Between Sequences and Objects]

First, the relationship between the sequences necessary to satisfy the specifications required for the system to be designed and each object to and from which messages are delivered and received is shown in a table.

Described below are details of FIG. 18. FIG. 18 is a table indicating the relationship between all sequences required for the action of "making Data" and all objects to and from which messages are delivered and received in each of these sequences.

In the table shown in FIG. 18, the names of the objects to and from which messages are delivered and received in each sequence are indicated in each line. Fig. No. of each diagram shown in FIG. 8 to FIG. 17 is indicated in each column. All these Fig. Nos. are the Fig. Nos. of the diagrams showing each sequence required for the action of "making Data" which has been so far explained above.

Further described below are some more details of FIG. 18. For example, the Frame object 60 appears in each diagram from FIG. 8 to FIG. 17, so a round mark is put on all the items in the line of the Frame object 60.

For example, the Data object 70 appears in each diagram from FIG. 8 to FIG. 12, so a round mark is put on the items corresponding to each diagram from FIG. 8 to FIG. 12 in the line of the Data object 70.

Similarly, round marks are put on the items corresponding to each diagram in which the Coded Data object 71, Divided Data object 72, Complexed Data object 73, Rate Table object 80, Scrambler object 90, Encoder object 91, Complexed Encoding object 92 and Pilot object 93 appear.

[5.2 Exclusion of Objects Which are not the Reference Objects for Grouping Sequences]

Next, the objects which cannot be the reference objects for grouping sequences are excluded from the reference sequences with reference to the relationship between each sequence and each object as arranged above.

First, objects which are the common objects to and from which messages are delivered and received cannot be the reference objects for grouping the sequences, so the objects are excluded from the reference objects for grouping the sequences.

In the table shown in FIG. 18, the Frame object 60 is the common object to and from which messages are delivered and received in the sequence shown in each sequence diagram from FIG. 8 to FIG. 17, so the Frame object 60 is excluded from the reference objects for grouping the sequences.

Then, the object to and from which messages are delivered and received in only one sequence among the objects which are left as the reference objects for grouping the sequences could not give rise to competition, so that the object is excluded from the reference objects for grouping the sequences because there is no need to make the object the reference objects for grouping the sequences.

In the table shown in FIG. 18, the Scrambler object 90 is the object to and from which messages are delivered and received only in the sequence 230 of "scrambling" shown in FIG. 11; the Encoder object 91 is the object to and from which messages are delivered and received only in the sequence 240 of "convoluting" shown in FIG. 12; the Complexed Encoding object 92 is the object to and from which messages are delivered and received only in the sequence 270 of "converting into a complex number" shown in FIG. 15; the Pilot object 93 is the object to and from which messages are delivered and received only in the sequence 290 of "adding a Pilot" shown in FIG. 17, so that these objects are excluded from the reference objects for grouping the sequences.

Then, the object dedicated to reading only in which no data is written-in in the whole sequences where messages are delivered and received, for example, the object used to provide unchanged data among the objects which are left as the reference objects for grouping the sequences does not cause any inconvenience even if the implementation order of the sequences is changed, and does not cause any big influence even if competition occurs, so that this object is excluded from the reference objects for grouping the sequences.

In the table shown in FIG. 18, the Rate Table object 80 is the object to and from which messages are delivered and received in the sequence 200 of "adding a Tail" shown in FIG. 8; in the sequence 220 of "making a PAD" shown in FIG. 10; in the sequence 230 of "scrambling" shown in FIG. 11; in the sequence 240 of "convoluting" shown in FIG. 12; in the sequence 250 of "dividing data" shown in FIG. 13; in the sequence 260 of "providing interleaving" shown in FIG. 14; in the sequence 270 of "converting into a complex number" shown in FIG. 15; and in the sequence 280 of "normalizing" shown in FIG. 16. However, this object is the one dedicated to reading only in which no data is written-in in the these whole sequences, so that this object is excluded from the reference objects for grouping the sequences.

From all the above, the Data object 70, the Coded Data object 71, the Divided Data object 72, and the Complexed Data object 73 are left as the reference objects for grouping the sequences among the objects to and from which messages are delivered and received in each sequence required for the action of "making Data."

[5.3 Grouping of Sequences on the Basis of Objects Left]

Next, each sequence is grouped based on the objects which are left as the reference objects for grouping the sequences.

Described below is FIG. 19. FIG. 19 is a table indicating the grouping of the sequences based on the table shown in FIG. 18.

In the table shown in FIG. 19, the number of the diagram in which a sequence diagram for the sequence belonging to the same group is shown is indicated in the same line. For example, it is shown in the table that the sequences which deliver and receive messages to and from the Data object 70, more specifically, the sequence 200 of "adding a Tail" shown in FIG. 8; the sequence 210 of "adding a Service field" shown in FIG. 9; the sequence 220 of "making a PAD" shown in FIG. 10; the sequence 230 of "scrambling" shown in FIG. 11; and the sequence 240 of "convoluting" shown in FIG. 12 belong to group A. The sequences belonging to the Data object 70 can be easily known by referring to the line of the Data object 70 in the table shown in FIG. 18.

In the same way, the sequences which deliver and receive messages to and from the Coded Data object 71 belong to group B; the sequences which deliver and receive messages to and from the Divided Data object 72 belong to group C; and the sequences which deliver and receive messages to and from the Complexed Data object 73 belong to group D, and the sequence diagram numbers showing the sequences which deliver and receive messages to and from these objects are shown in the table.

[5.4 Determination of Implementation Order of Sequences in a Group]

Next, the implementation order of each sequence in a group to which sequences belong is determined.

Since the sequences belonging to the same group deliver and receive messages to and from the same object, competition of access to the object can occur if these sequences are implemented in parallel. Then, the occurrence of the competition is avoided by making the sequences implemented one by one in the chronological order in the same group.

This order is determined based on the sequence diagram made according to the scenario described above.

For example, the sequences belonging to group A are implemented in the order of a sequence 200 of "adding Tail," a sequence 210 of "adding Service Field," a sequence 220 of "making PAD" and a sequence 240 of "picturing" according to the implementation order of each sequence in the sequence diagram shown in FIG. 7.

In the same way, the sequences belonging to group B are implemented in the order of a sequence 240 of "convoluting" (FIG. 12) and a sequence 250 of "dividing data" (FIG. 13); the sequences belonging to group C are implemented in the order of a sequence 250 of "dividing data" (FIG. 13), a sequence 260 of "interleaving" (FIG. 14) and a sequence 270 of "converting into a complex number" (FIG. 15) according to the implementation order of each sequence in the sequence diagram shown in FIG. 7; and the sequences belonging to group C are implemented in the order of a sequence 270 of "converting into a complex number" (FIG. 15), a sequence 280 of "normalizing" (FIG. 16) and a sequence 290 of "adding Pilot" (FIG. 17), according to the implementation order of each sequence in the sequence diagram shown in FIG. 7.

[5.5 Dissolution of the Duplication of Sequences Belonging to a Plurality of Groups in Duplication]

Next, the sequences belonging to a plurality of groups in duplication are made to dissolve the duplication and belong to only one of the groups.

The sequence 240 of "convoluting" which is shown as "FIG. 12" in FIG. 19 belongs to group A and group B. In the same way, the sequence 250 of "dividing data" which is shown as "FIG. 13" in FIG. 19 belongs to group B and group C, and the sequence 270 of "converting into a complex number" which is shown as "FIG. 15" in FIG. 19 belongs to group C and group D.

First, the sequence 240 of "convoluting" is examined.

When reference is made to FIG. 12 showing the sequence diagram of the sequence 240 of "convoluting", it is known that the Data object 70 is operated only by the implementation of sequences such as encode message 242, etc., and that the Data object 70 is created by the implementation of another sequence, more specifically, the new message 202 in the sequence 200 of "adding Tail." The Coded Data object 71 is created for the first time by the implementation of sequence of the new message 244 shown in FIG. 12.

Attention is drawn to the Data object 70. Since it is clear that in order to implement the sequence of the encode message 243, the Data object 70 must be created before the implementation of the sequence, it is necessary to implement the sequence of the new message 202 in the sequence 200 of "adding Tail" before this sequence is implemented. In other words, in order to implement the sequence 240 of "convoluting" shown in FIG. 12, the sequence 200 of "adding Tail" shown in FIG. 8 must be implemented before the sequence is implemented.

Since the Coded Data object 71 is created for the first time by the implementation of the new message 244 shown in FIG. 12, the Coded Data object 71 cannot be the factor which puts a limit to the implementation order of the sequence 240 of "convoluting".

From all the above, it is known that all that must be done is to make the sequence 240 of "convoluting" shown in FIG. 12 belong only to group A in which the implementation order for dissolving the belonging to group B and avoiding the competition of the Data object 70 is determined.

Next, the sequence 250 of "dividing data" is examined.

When reference is made to FIG. 13 showing the sequence diagram of the sequence 250 of "dividing data", it is known that the Coded Data object 71 is operated only by the implementation of sequences such as divided message 251, etc., and that the Coded Data object 71 is created by the implementation of another sequence, more specifically, by the implementation of the sequence 240 of "convoluting". The Divided Data object 72 is created for the first time by the implementation of the new message 253 shown in FIG. 13.

For the same reason as described above, it is known that all that must be done is to make the sequence 250 of "dividing data" shown in FIG. 13 belong only to group B in which the implementation order for dissolving the belonging to group C and avoiding the competition of the Coded Data object 71 is determined.

Next, the sequence 270 of "converting into a complex number" is examined.

When reference is made to FIG. 15 showing the sequence diagram of the sequence 270 of "converting into a complex number", it is known that the Divided Data object 72 is operated only by the implementation of sequences such as convert Complex message 271, etc., and that the Divided Data object 71 is created by the implementation of another sequence, more specifically, by the implementation of the sequence 250 of "dividing data" shown in FIG. 13. The complexed Data object 73 is created for the first time by the implementation of the new message 273 shown in FIG. 15.

For the same reason as described above, it is known that all that must be done is to make the sequence 270 of "converting into a complex number" shown in FIG. 15 belong only to group C in which the implementation order for dissolving the belonging to group D and avoiding the competition of the Divided Data object 72 is determined.

Grouping of each sequence is completed by the operations of [5.1], [5.2], [5.3], [5.4], and [5.5] described above.

[6. Division into Functional Blocks]

Next, sequences which have been grouped are collected into functional blocks.

Here, some explanations are given to FIG. 20. FIG. 20 is a table showing the results of dividing the function of "making Data" among the transmission action which is the specifications required for the system to be designed into functional blocks.

From all the above examinations, the functional block in which the sequence 200 of "adding Tail" (FIG. 8), the sequence 210 of "adding Service Field" (FIG. 9), the sequence 220 of "making PAD" (FIG. 10), the sequence 230 of "scrambling" (FIG. 11), and the sequence of "convoluting" (FIG. 12) which belong to group A are implemented is made BLOCK 1; the functional block in which the sequence 250 of "dividing data" (FIG. 13) which belongs to group B is implemented is made BLOCK 2; and the functional block in which the sequence 260 of "providing interleaving" (FIG. 14) and the sequence 270 of "converting into a complex number" (FIG. 15) which belong to group C are implemented is made BLOCK 3; and the functional block in which the sequence 280 of "normalizing" (FIG. 16) and the sequence 290 of "adding Pilot" (FIG. 17) which belong to group D are implemented is made BLOCK 4, as shown in FIG. 20.

The above-mentioned function of "making Data" is realized by implementing each functional block obtained in such a way in this order.

The results obtained by dividing the above-mentioned function of "making Data" obtained in such a way as described above into functional blocks are shown in FIG. 21. The sequence diagrams showing the implementation order of each sequence to be implemented by each functional block, which corresponds to the divided results in the sequence diagram shown in FIG. 7, are shown in FIG. 22, FIG. 23, FIG. 24, and FIG. 25.

The functions required for the system to be designed are divided appropriately so that the competition among the sequences is lessened by the operations described above, and the design of the system is completed, and after then, the process moves to the design of each functional block as a unit.

FIG. 26 sows the configuration of the functional-block division system embodying the present invention. In FIG. 26, 301 is a CPU; 302 is a ROM; 303 is a RAM; 304 is a hard disk device; 305 is an operation input unit; 306 is a display device; 307 is an input/output device; and 308 is a bus. The CPU 301, ROM 302, RAM 303, hard disk device 304, operation input unit 305, display device 306, and input/output device 307 are all connected to the bus 308, and all these devices and units can deliver and receive data to and from each other.

The CPU 301 is the central processing unit which controls the whole operation of the functional-block division system (hereinafter referred to as "this system").

The ROM (Read Only Memory) 302 is the memory in which the control program which is executed by the CPU 301 is stored. The whole operation of this system is controlled by the CPU's 301 executing this control program.

The RAM (Random Access Memory) 303 is the memory which is used where necessary as a temporary storage region for various kinds of data or as a work memory when the CPU 301 executes the control program stored in the ROM 302.

The hard disk device 304 is the storage device which stores various kinds of data files when the CPU 301 performs the system design aid processing which will be described later. A dictionary table file which shows the relationship between a word and the part of speech of the word is stored in advance in the hard disk device, and this dictionary data file is used for the analysis of the part of speech of the words used for the scenarios mentioned above.

By making the hard disk device 304 store the control program in advance instead of making the ROM 302 store the control program, when this system is started, the CPU 301 can be made to read the control program from the hard disk device 304 and store it once in the RAM 303, and after then the CPU 301 can be made to read the control program from the RAM 303 and execute it to control the operation of the whole system.

The operation input unit 305 has an input device such as a keyboard and a mouse which is operated by a user who uses this system, and acquires the status of the operation performed for these input devices.

The display device 306 is a device which displays what is instructed by the CPU 301, such as a device using a CRT (cathode ray tube) or a LCD (liquid crystal display).

The input/output device 307 is a device which receives information inputted from outside, for example, a specification information file in which the specification required for the system to be designed is indicated and transmits the specification information file to the CPU 301 or outputs what is instructed by the CPU 301, for example, information indicating the results of dividing into functional blocks which are the results of the system design and information indicating the sequences for operating the functional blocks. The input/output device 307 comprises a device which reads and writes in a portable type recording medium such as a FD (flexible disk), a CD-ROM (compact disk-ROM), a DVD-ROM (digital versatile disk-ROM) and an MO (magneto-optic) disk. Also, an interface device which exchanges input and output information with other devices via a communication network can be provided as the input/output device 307. Moreover, a printer device which prints the contents outputted from the CPU 301 on paper can provided an the input/output device 307.

This system comprises each constituent specified above.

The configuration of this system is one which many standard computer systems have, and therefore the present invention can be carried out by such a computer system.

Next, described below is the control processing which is implemented by the CPU 301 in this system. Each of the processing described hereinafter is realized by the CPU's 301 executing the control program which controls this system.

Figure 27:
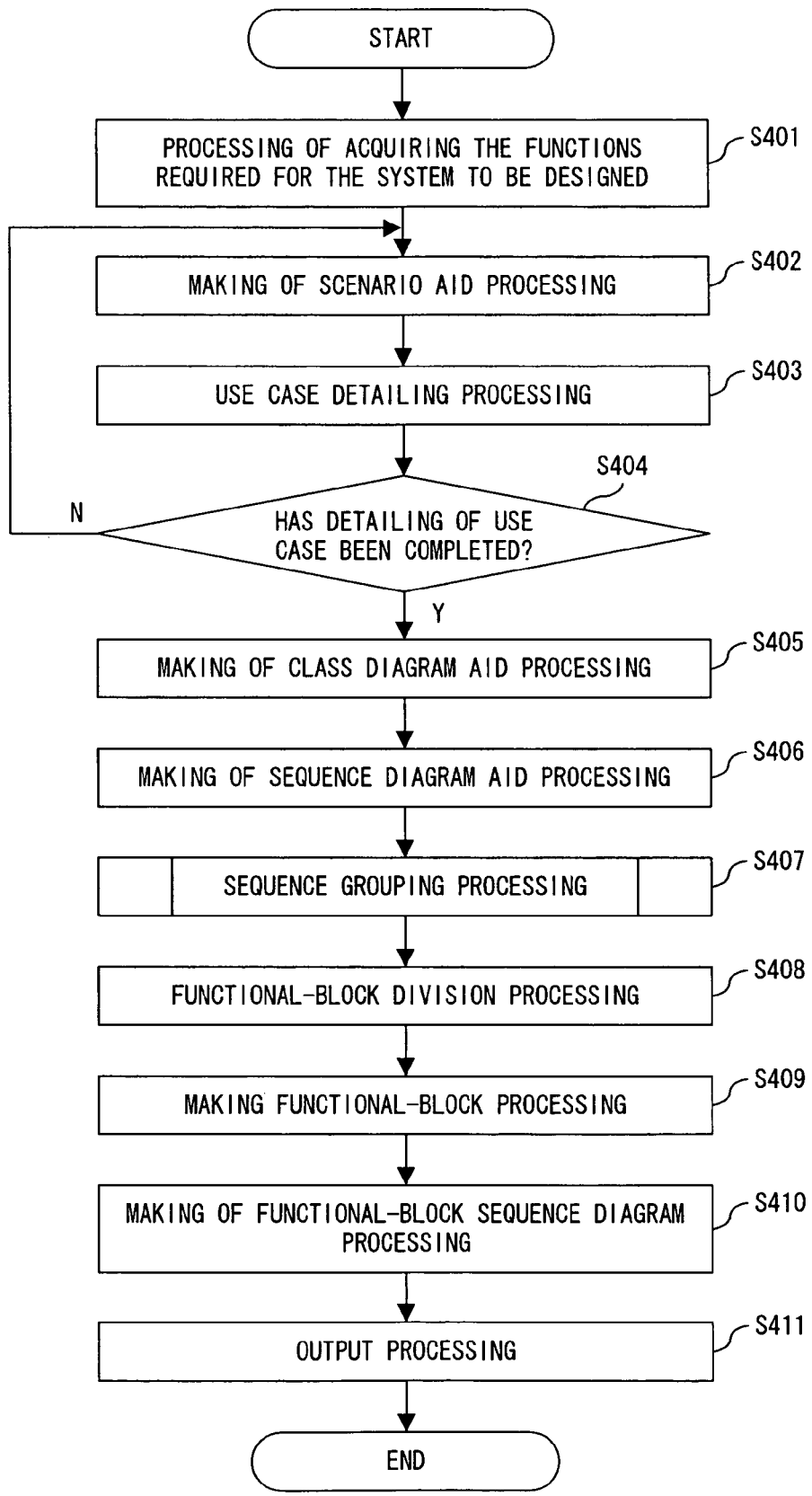
FIG. 27 is a flowchart showing the processing contents of a system design aid processing implemented by a CPU 301.

FIG. 27 is explained hereunder. FIG. 27 is a flowchart showing the processing contents of system design aid processing implemented by a CPU 301. By making the CPU 301 implement the processing shown in FIG. 27, the division of the functions required for the system to be designed into functional blocks is implemented by this system.

First, the processing of acquiring the functions required for the system to be designed is implemented in Step S401. This processing is implemented for the operation of [1. Extraction of Functions] to be conducted using this system. The information indicating the use case diagram corresponding to the functions required for the system to be designed, as shown in FIG. 3, is acquired by this processing, and the information data file in which this information acquired is stored is stored in the hard disk device 304. In acquiring the information indicating the use case diagram in this processing, for example, the CPU 301 can be made to acquire the operation contents for the operation input unit 305 by a user and display the drawing of the use case diagram corresponding to the operation in the display device 306, and to acquire the information indicating the use case diagram, or, for example, the CPU 301 can be made to acquire the information indicating the use case diagram existing outside this system via the input/output device 307.

Next, the making of scenario aid processing is implemented in Step S402. Accordingly, the information representing the sentences of the scenario which is inputted, for example, by a user's operating the operation input unit 305 is acquired by the CPU 301, and the information is stored in the hard disk device 304.

Then, the use case detailing processing is implemented in Step S403. Accordingly, the words, the parts of speech of which are verbs are extracted from the scenario which is processed and acquired in the preceding step, and a use case diagram shown in FIG. 4 in which the extracted words are indicated is made. For the analysis of the parts of speech of the words used in the scenario, reference is made to the dictionary table file stored in the hard disk device 304.

Then, whether detailing the use case has been completed is judged in Step S404. If the result of this judgement is Yes, the process proceeds to Step S405, and if the result of this judgement is No, the process goes back to Step S403, and the processing of Step S403 and step S404 is repeated. In this processing, for example, the CPU301 makes the display device 306 display the question querying whether detailing the use case has been completed, the CPU 301 acquires the operation contents of the operation input unit 305 which indicates the response to the question made by the user, and the result of judgement can be determined based on the operation contents.

The processing S402 to S404 is implemented for the operation of [2. Making of scenario and detailing of use case] to be conducted using this system.

Then, the making of class diagram aid processing is implemented in Step S405. Accordingly, the words, the parts of speech of which are nouns are extracted from the scenario acquired by the processing in Step S402 based on the dictionary table file stored in the hard disk device 304, and a detailed class diagram shown in FIG. 5 in which the extracted words are indicated is made. This processing is implemented for the operation of [3. Clarification of logical structure] to be conducted using this system.

In Step S406, the making of sequence diagram aid processing is implemented. Accordingly, the sequence to be implemented to realize the operation of each use case as shown in FIG. 6 and FIG. 7, the procedure for the implementation of the sequence, the sequence to be implemented to realize the operation of each detailed use case as shown in FIG. 8 to FIG. 17, and the sequence diagram indicating the implementation of the sequence are made. This processing is such that, for example, the CPU 301 acquires the operation contents which the user inputs to the operation input unit 305, and the CPU 301 makes the display device 306 display the sequence diagram corresponding to the operation, acquires the information indicating the use case diagram, and stores the information in the hard disk device 304. This processing is implemented for the operation of [4. Making of action flow] to be conducted using this system.

In Step S407, the sequence grouping processing is implemented. Accordingly, when all necessary sequences are integrated into some functional blocks to satisfy the specifications required for the system to be designed which have been obtained by all the above processing, grouping of each sequence is carried out so that the occurrence of the competition of objects among the sequences in each of the functional blocks is minimized. This processing is implemented for the operation of [5. Grouping of sequences] to be conducted using this system, and the details of the processing will be described later.

In Step S408, the functional block-division processing is implemented. Accordingly, the sequences grouped by the processing in the preceding step are integrated into functional blocks, and the division of the sequences into functional blocks which are required for the system to be designed is completed. More specifically, a table indicating the division results shown in FIG. 20 is made based on the processing results of the preceding step, and the information indicating this table is stored in the hard disk device 304.

Figure 21:
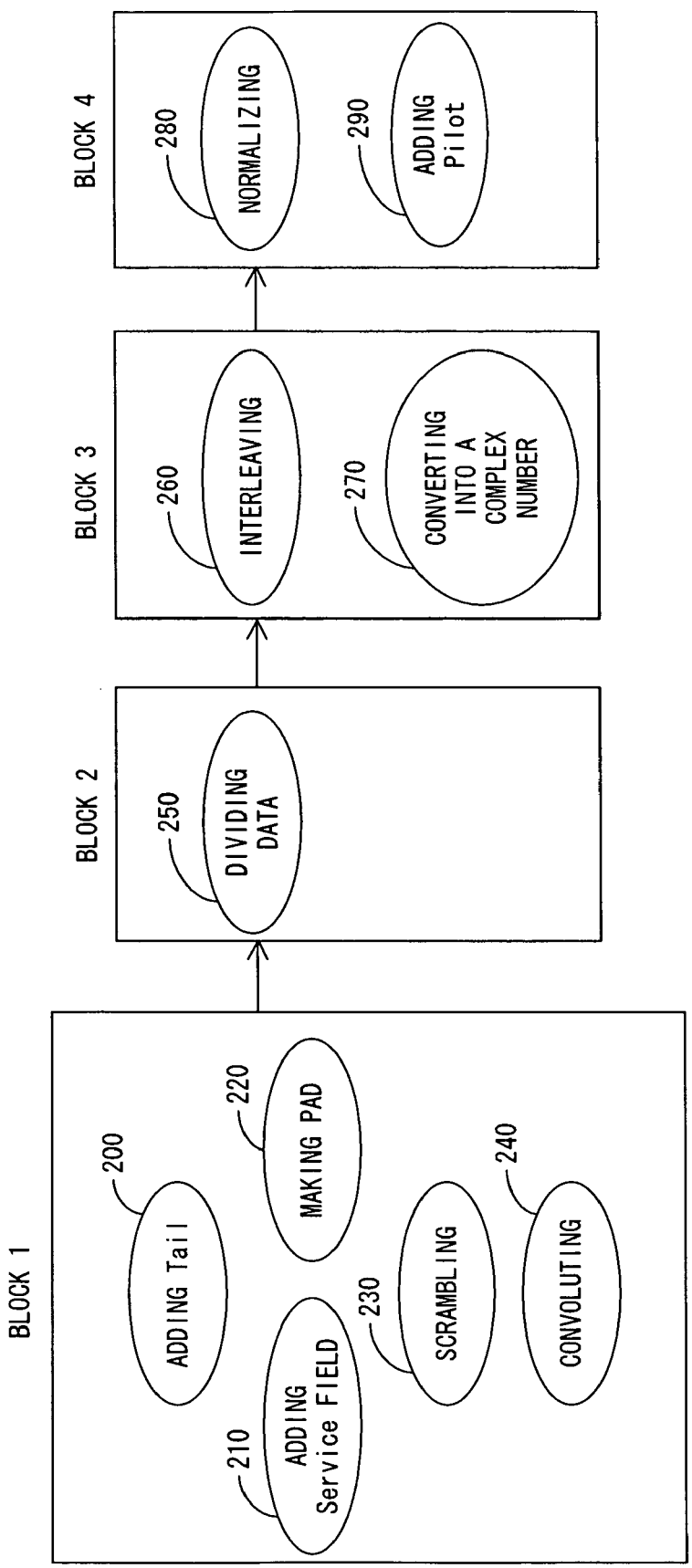
FIG. 21 shows the results of divided functional blocks of the function of "making data".
Figure 22:
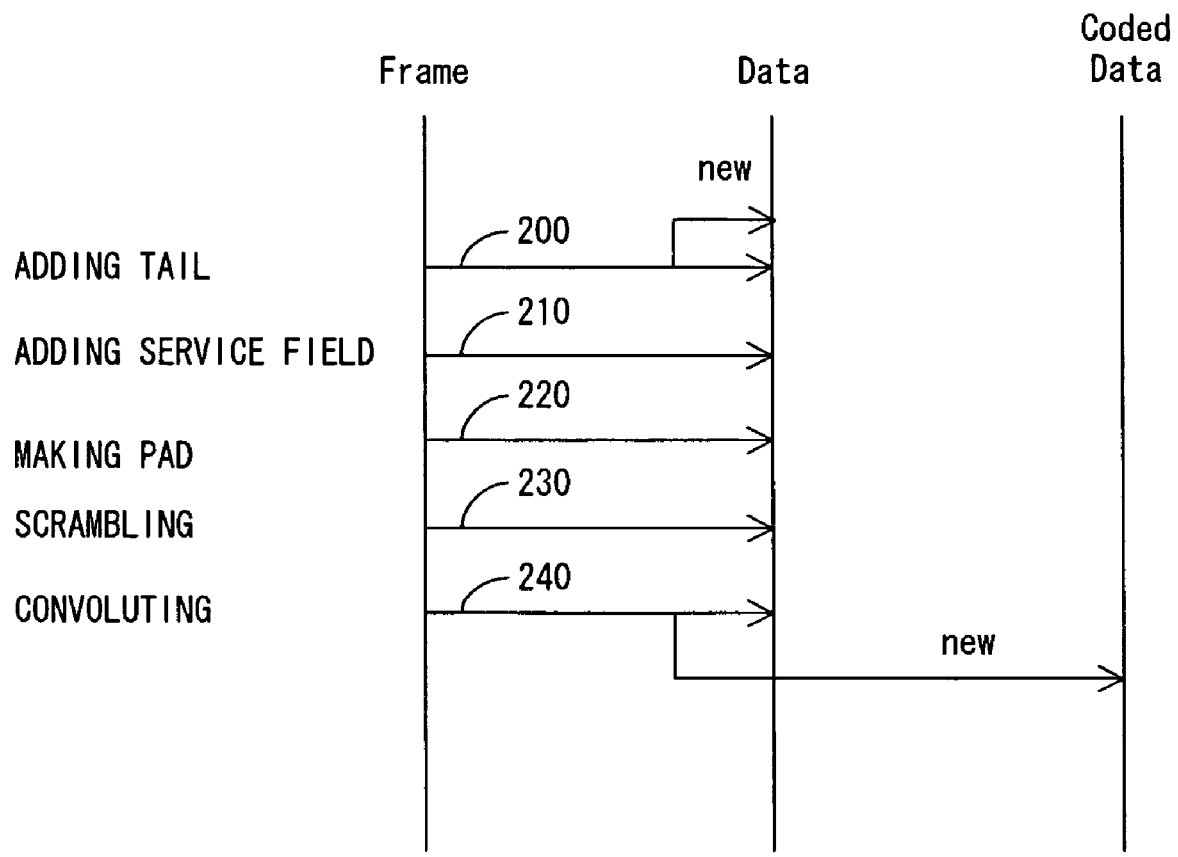
FIG. 22 shows the sequence indicating the implementation order of each sequence implemented in functional block 1 shown in FIG. 21.
Figure 23:
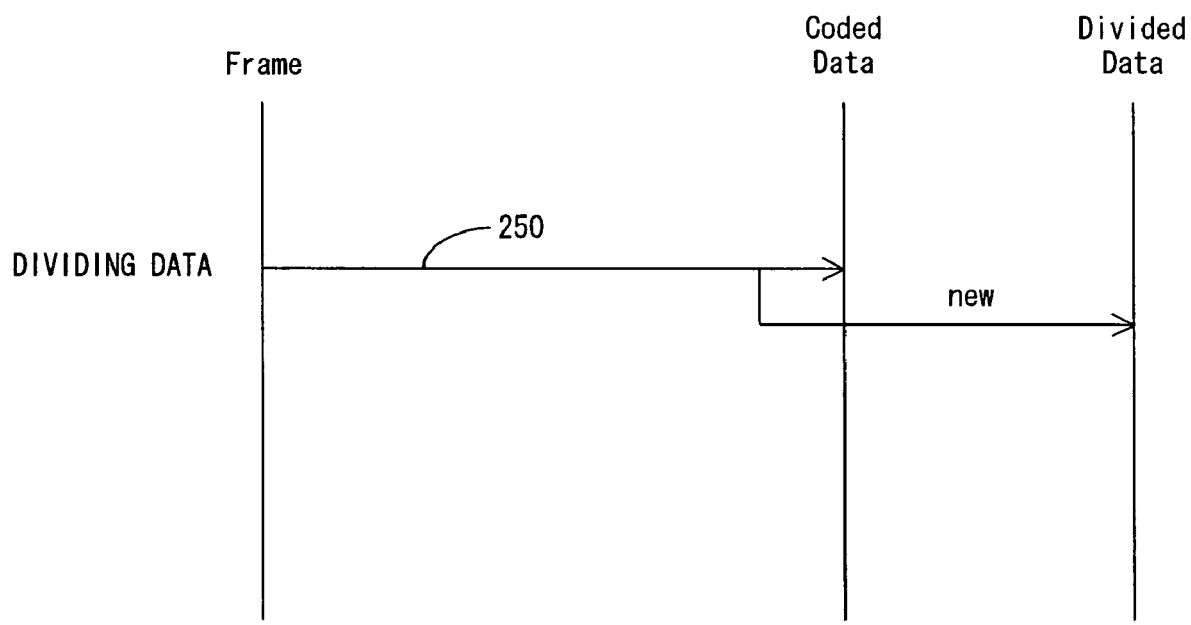
FIG. 23 shows the sequence indicating the implementation order of each sequence implemented in functional block 2 shown in FIG. 21.
Figure 24:
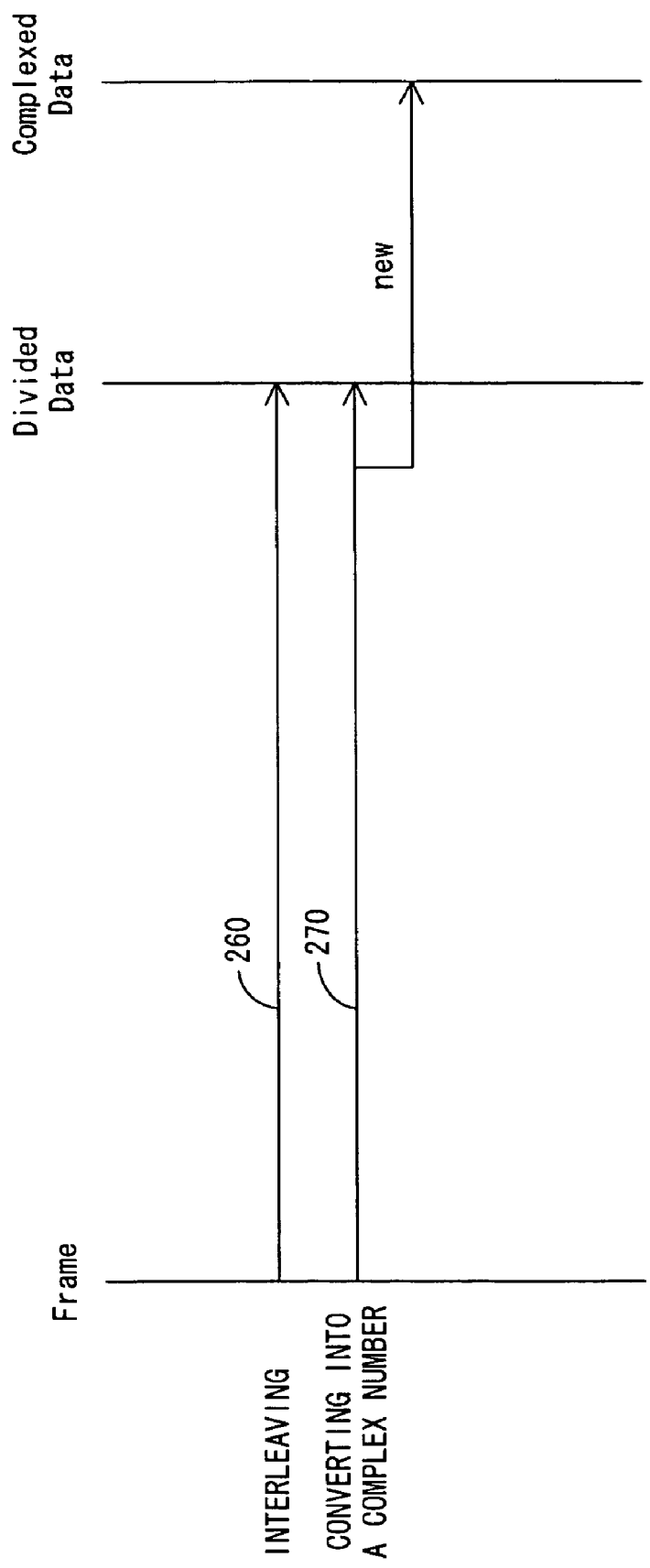
FIG. 24 shows the sequence indicating the implementation order of each sequence implemented in functional block 3 shown in FIG. 21.

In Step S409, the functional-block diagram making processing is implemented. Accordingly, a functional-block diagram showing the relationship of subordination of each sequence to each functional block as shown in FIG. 21 is made based on the table indicating the division results made by the processing of the preceding step, and the information indicating this functional-block diagram is stored in the hard disk device 304.

In Step 410, the making of functional block sequence diagram processing is implemented. Accordingly, a sequence diagram indicating the implementation order of each sequence to be implemented in each functional block as shown in FIG. 22 to FIG. 25 is made based on the sequence diagram made by the processing of Step 406 and the table indicating the division results made by the processing of Step 408, and the information indicating this sequence diagram made is stored in the hard disk device 304.

The processing from Step S408 to Step S410 is implemented for the operation of [6. Division into functional blocks] to be conducted using this system.

In Step S411, the output processing is implemented. Accordingly, the information indicating the functional block diagram made by the processing of S409 and S410, and the information indicating the sequence diagram are read from the hard disk device 304, and each diagram shown by the information is displayed on the display device 306. The information is outputted by the input/output device 307 according to the user's instructions.

All the above processing is the system design aid processing.

Next, described below is the sequence grouping processing to be implemented by the CPU 301 as the processing of Step S407 in the above-mentioned system design processing with reference to the flowchart showing the processing contents of the sequence grouping processing shown in FIG. 28.

First, in Step S501, the relationship table making processing is implemented. Accordingly, the information indicating the sequence to be implemented to realize the action of each detailed use case made by the processing of up to Step S406 in the system design processing as well as the sequence diagram showing the procedure for implementation of the sequence as shown in FIG. 8 to FIG. 17 is read from the hard disk 304; the relationship table showing the relationship between all the sequences necessary to realize the functions required for the system to be designed and all the objects to and from which messages are delivered and received in these sequences as shown in FIG. 18 is made from the information; the information indicating the relationship table made is stored in the hard disk 304. This processing is implemented for the operation of [5.1 Arrangement of relationship between sequences and objects] to be conducted using this system.

Then, in Step S502, the grouping reference-object extraction processing is implemented. This processing is implemented for the operation of [5.2 Exclusion of objects which are not the reference objects for grouping sequences] to be conducted using this system, and more specifically, the following processing from Step S502-1 to Step S502-3 is implemented.

In Step S502-1, the processing of excluding objects common to all the sequences is implemented. Accordingly, the objects in which the fact that the objects are the common objects to and from which messages are delivered and received in all the sequences is shown in the relationship table, among the objects shown in the relationship table made by the processing of Step S501, are excluded from the reference objects for grouping the sequences.

In Step S502-2, the processing of excluding objects used in a single sequence is implemented. Accordingly, the objects to and from which messages are delivered and received only in one sequence, among the objects which are left as reference objects for grouping the sequences, are excluded from the reference objects for grouping the sequences.

In Step S502-3, the processing of excluding objects used only for reading is implemented. Accordingly, the objects which are not used for writing but used only for reading in all the sequences to and from which messages are delivered and received, among the objects which are left as reference objects for grouping the sequences, are excluded from the reference objects for grouping the sequences.

All the above processing is the grouping reference-object extraction processing in Step S502.

Then, in Step S503, a processing of detailing the sequence implementation order with in a group is implemented. Accordingly, each sequence shown in the relationship table made by the processing of Step S501 is grouped based on the objects which are left as the reference objects for grouping the sequences, and the table shown in FIG. 19 is made. Then, the implementation order of each sequence shown in the table within the group is determined based on the information indicating the sequence diagrams as shown in FIG. 8 to FIG. 17 which are made by the processing of up to Step S406 which is stored in the hard disk device 304. This processing is implemented for the operation of [5.3 Grouping of sequences on the basis of objects left] and [5.4 Determination of implementation order of sequences within a group] to be conducted using this system.

In Step S504, the sequence duplication dissolution processing is implemented. Accordingly, the processing of dissolving the duplication of sequences belonging to a plurality of groups, among the sequences grouped by the processing of the preceding step, is implemented based on the order relationship of the created sequences of the objects acquired by the information indicating the sequence diagrams as shown in FIG. 8 to FIG. 17 which are made by the processing of up to S406, and all the sequences are made to belong to only one of the groups. This processing is implemented for the operation of [5.5 Dissolution of the duplication of sequences belonging to a plurality of groups in duplication] to be conducted using this system.

All the above processing is the sequence grouping processing. By making the CPU 301 implement this processing, grouping of each sequence is carried out so that the occurrence of the competition of objects among the sequences in each of the functional blocks is minimized.

Then, in regard to the improvement of the present invention, described below is the division into functional blocks using the integration of sequences. When the division into functional blocks cannot be carried out by the above-mentioned method since a plurality of sequences having objects common to the sequences belonging to other groups belong to the same groups, this division makes it possible to divide the sequences into functional blocks by integrating the sequences into one sequence.

First, FIG. 29 is explained. FIG. 29 is a table showing an example of the relationship between all the sequences necessary to realize a function and all the objects to and from which messages are delivered and received in these sequences, and this table is similar to that shown in FIG. 18.

The relationships between five sequences (Sequence 1 to Sequence 5) and three objects (Object A to Object C) are shown in FIG. 29. Here, all the five sequences are supposed not to be read-only sequences.

First, grouping the sequences shown in FIG. 29 is tried according to the above-mentioned method. In the following explanation, for convenience sake, the above-mentioned method is referred to as a "first method" and the method which will be explained from now on is referred to as a "second method."

FIG. 30, FIG. 31 and FIG. 32 show examples of the results obtained by trying the grouping which is implemented according to a first method for the sequences shown in the table of FIG. 29.

FIG. 30 shows an example in which as a result of having dissolved the belonging of Sequence 3 to a plurality of groups, Sequence 1, Sequence 2 and Sequence 3 are made to belong to Group A in this implementation order, and Sequence 4 and Sequence 5 are made to belong to Group B. In this example, however, competition can occur because Sequence 2 belonging to Group A and Sequence 4 belonging to Group B access the same object B. In other words, since no competition can be avoided in this grouping, it is inappropriate to divide sequences into functional blocks by means of this grouping.

FIG. 31 shows an example in which as a result of having dissolved the belonging of Sequence 2 and Sequence 4 to a plurality of groups, Sequence 1, Sequence 3 and Sequence 2 are made to belong to Group A in this implementation order, and Sequence 4 is made to belong to Group B, and Sequence 5 is made to belong to Group C. In this example, however, the competition of the sequence for Object B can be avoided, but the competition can occur because Sequence 3 belonging to Group A and Sequence 5 belonging to Group C access the same object C. In other words, since no competition can be avoided in this grouping, it is inappropriate to divide sequences into functional blocks by means of this grouping.

FIG. 32 shows an example in which as a result of having dissolved the belonging of Sequence 2 and Sequence 4 to a plurality of groups, Sequence 1 and Sequence 2 are made to belong to Group A in this implementation order, and Sequence 4 is made to belong to Group B, and Sequence 3 and Sequence 5 are made to belong to Group C. In this example, however, the competition of the sequences for Object B and Object C can be avoided, but the competition can occur because Sequence 1 and Sequence 2 belonging to Group A and Sequence 3 belonging to Group C access the same object A. In other words, since no competition can be avoided in this grouping, it is inappropriate to divide sequences into functional blocks by means of this grouping.

The duplication of sequences cannot be dissolved by the above-mentioned method because a plurality of sequences which have the object common to the sequences belonging to other groups as the object of access belong to the same group. As a result, the division of sequences into functional blocks sometimes cannot be carried out. In such a case, it is possible to divide sequences into functional blocks by integrating the sequences having an object common to the sequences belonging to other groups into one sequence.

Figure 33:
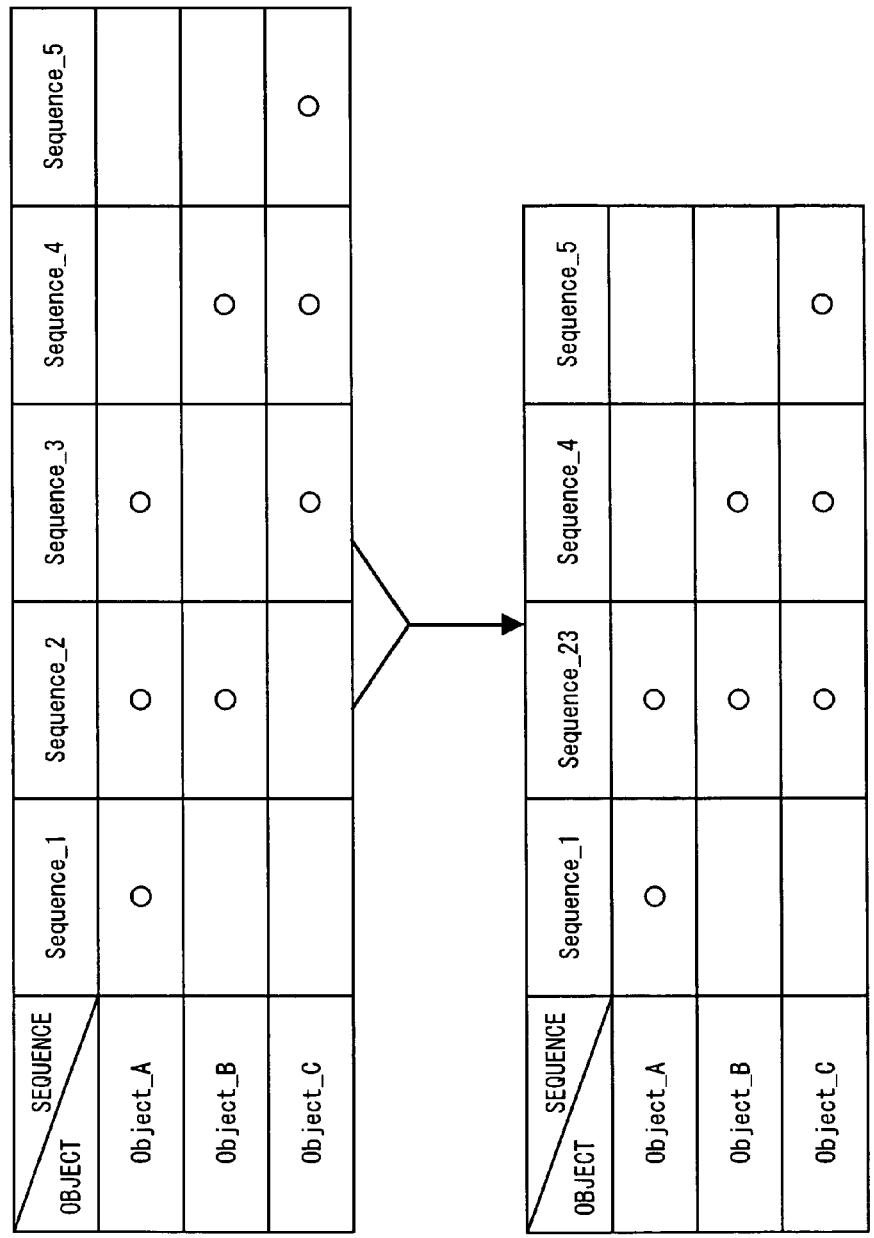
FIG. 33 shows the sequence integration which is implemented for the sequences shown in the table of FIG. 29.

Described below is FIG. 33. FIG. 33 shows the sequence integration implemented for the sequences shown in the table of FIG. 29.

In FIG. 33, the upper table shows the table prior to the sequence integration being implemented, which is the same as the table shown in FIG. 29. The lower table is the table after the sequence integration has been implemented.

First, with regard to the upper table shown in FIG. 33, Sequence 1, Sequence 2 and Sequence 3 which access Object A becomes one group, Sequence 2 and Sequence 4 which access Object B become one group, Sequence 3, Sequence 4 and Sequence 5 which access Object C become one group according to the operation of up to [5.4 Determination of implementation order of sequences in a group] in the first method mentioned above.

When attention is paid to Group A, Sequence 2 and Sequence 3 belonging to Group A access the object common to the sequences belonging to other groups. Then, Sequence 2 and Sequence 3 are integrated into one sequence. The upper table shown in FIG. 33 which is re-made using this integrated sequence is the lower table. After this table is made, all that must be done is to carry out the operation of [5.3 Grouping of sequences on the basis of objects left) and the subsequent operations newly again.

Described below is FIG. 34, which shows an example of the results acquired by trying the grouping which is implemented according to the first method for the sequences shown in the lower table of FIG. 33.

With regards to the table shown in FIG. 34, Sequence 1 and Sequence 23 which access Object A become one group;

Sequence 23 and Sequence 4 which access Object B become one group; and Sequence 23, Sequence 4 and Sequence 5 which access Object C become one group according to the operation of [5.3 Grouping of sequences on the basis of objects left] and [5.4 Determination of implementation order of sequences within a group] in the first method mentioned above.

It is possible to judge that all that must be done is to make Sequence 23 belong to Group A by paying attention to both Object B and Object C and to make Sequence 4 belong to Group B by paying attention to Object C according to the operation of [5.5 Dissolution of the duplication of sequences belonging to a plurality of groups in duplication] mentioned above.

Figure 35:
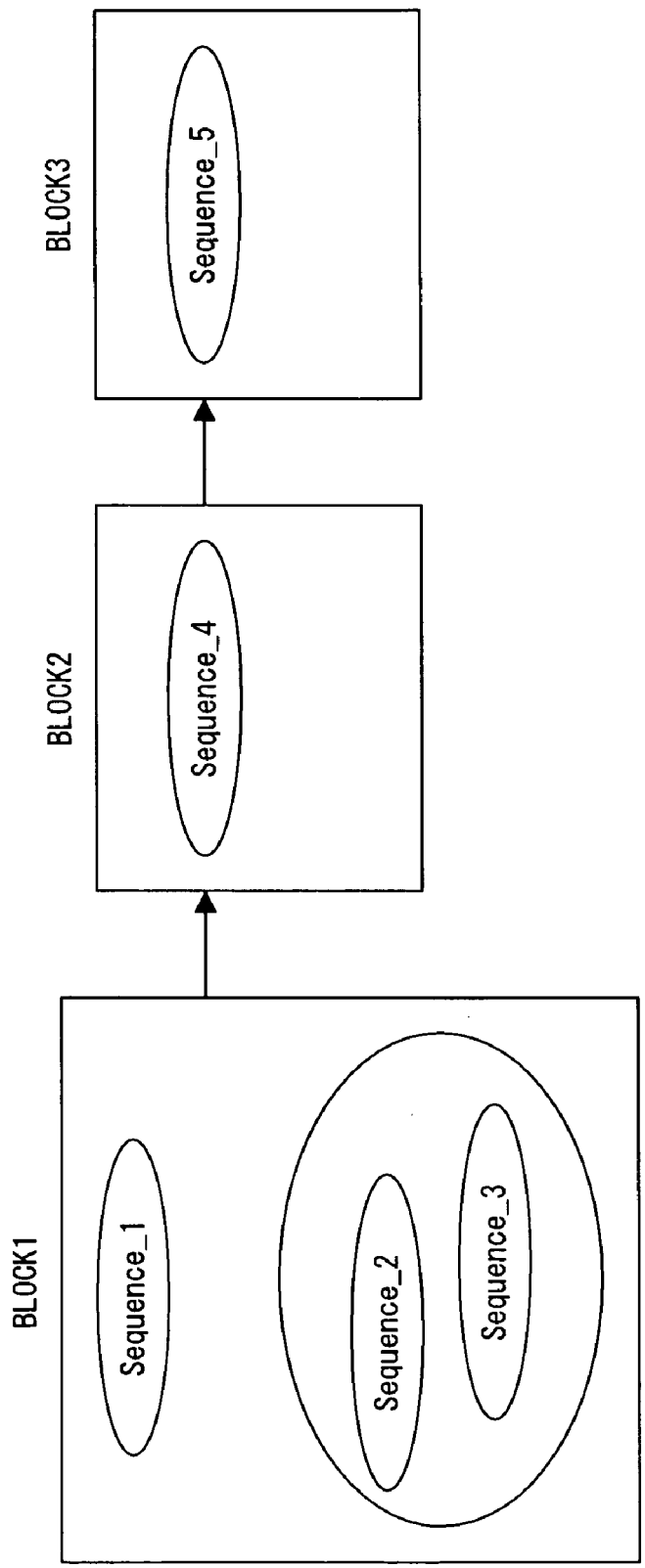
FIG. 35 shows the results obtained by dividing a system to be designed into functional blocks according to a second method.

FIG. 35 shows the results obtained by dividing sequences into functional blocks according to the second method which has been explained above.

Next, described is the processing to be performed by the CPU 301 to implement the second method in this system.

Figure 28:
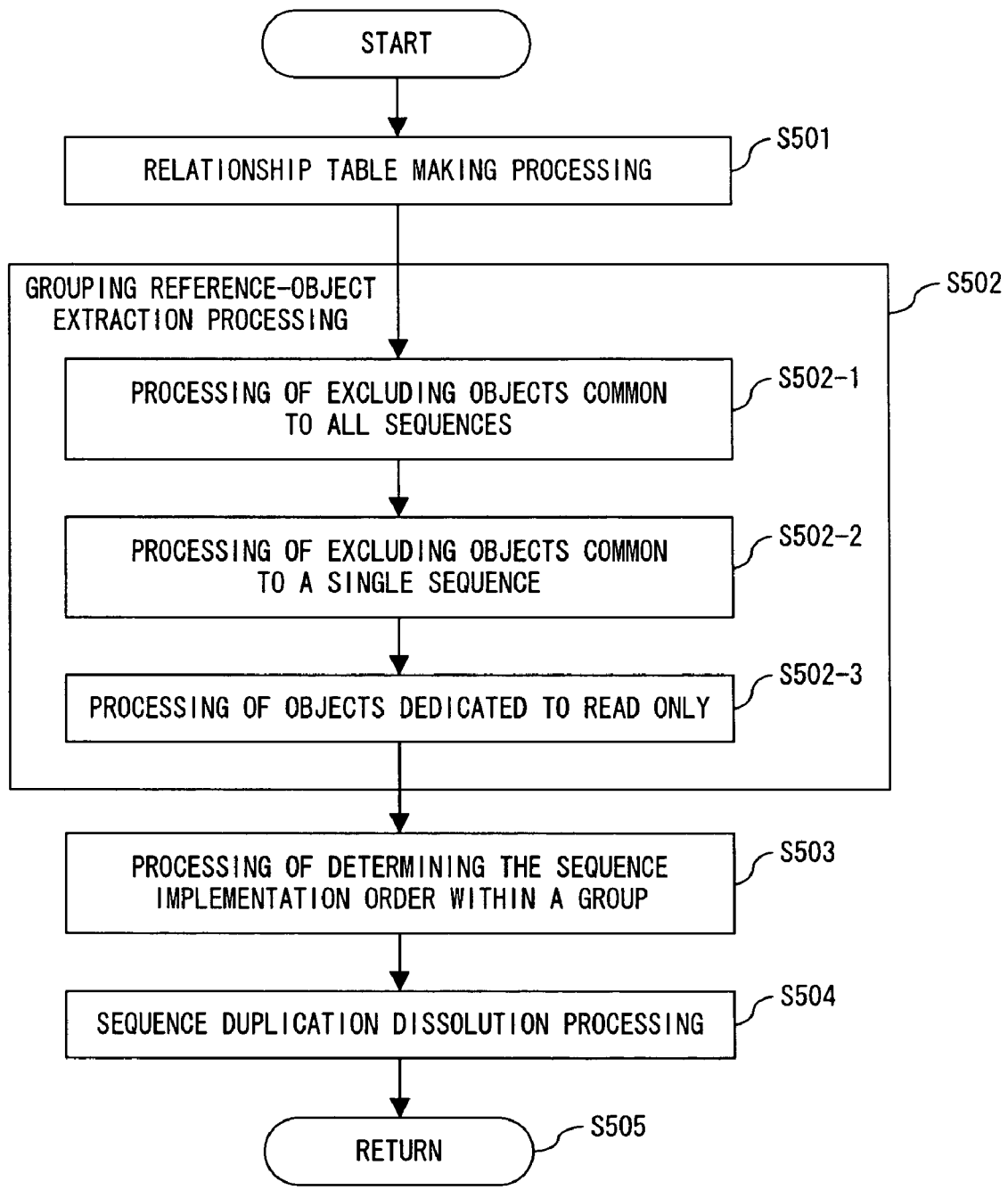
FIG. 28 is a flowchart showing the processing contents of sequence grouping processing.
Figure 36:
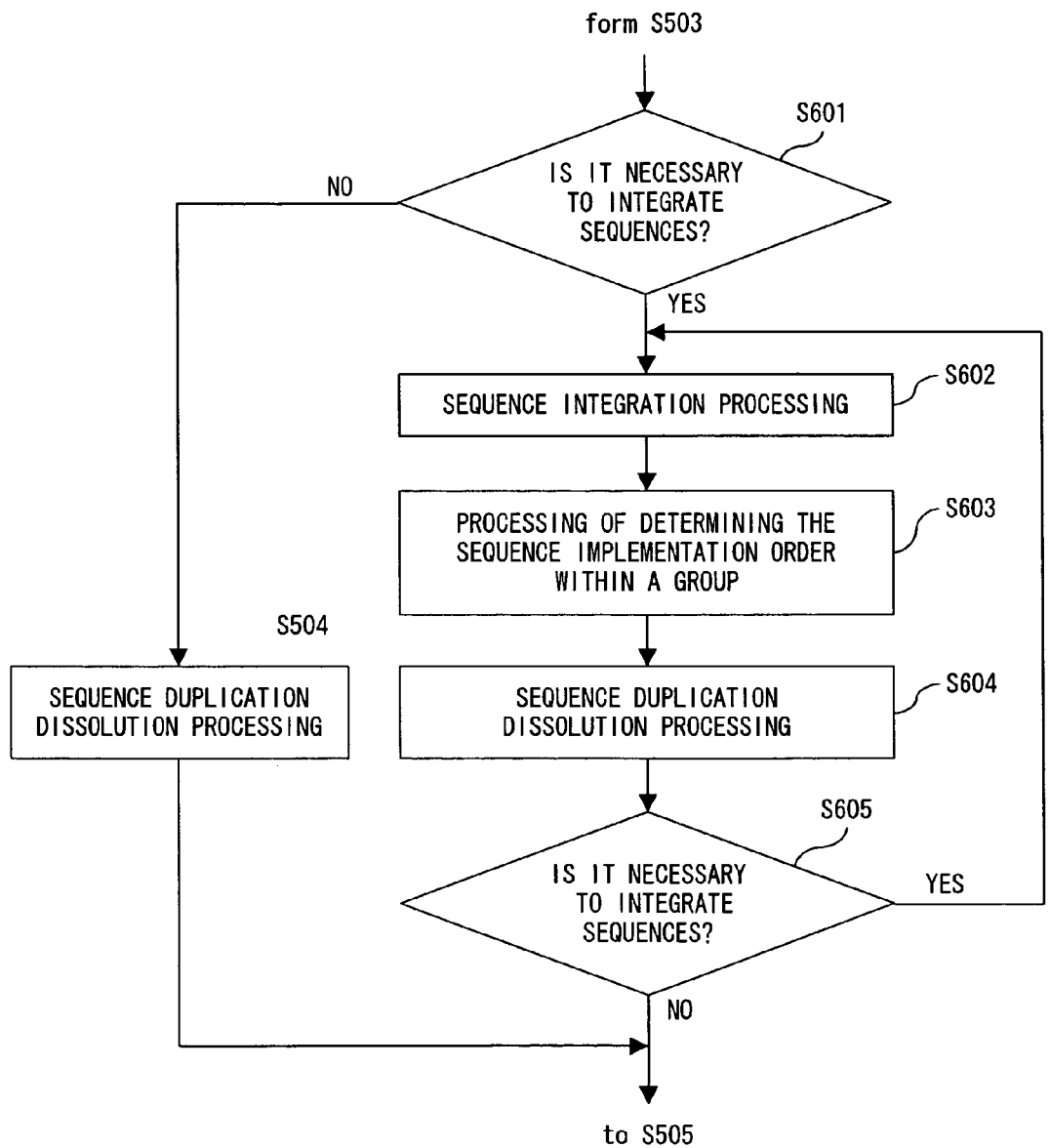
FIG. 36 shows the contents to be changed when the sequence grouping processing shown in the flowchart in FIG. 28 is changed and the above-mentioned sequence integration is implemented.

FIG. 36 shows the contents to be changed when the sequence grouping processing shown in the flowchart in FIG. 28 is changed and the above-mentioned sequence integration is made to be implemented. The flowchart shown in FIG. 36 is replaced by the processing of Step S504 shown in FIG. 28.

Following the processing of Step S503 shown in FIG. 28, the processing of judging whether the sequence integration is necessary or not is implemented in Step S601. In this processing, it is judged whether a plurality of sequences which access the object common to the sequences belonging to other groups among each group made by the processing of up to Step S503 exist. If the judgement result of Step S601 is Yes, the process proceeds to Step S602. If the judgement result of Step S601 is No, the processing of dissolving the duplication of sequences which is the processing of Step S504 shown in FIG. 28 is implemented, and after then, the processing of Step S505 and the subsequent processing shown in FIG. 28 are implemented.

In Step S602, the processing of integrating sequences is implemented. Accordingly, one group to which a plurality of sequences which access the object common to the sequences belonging to other groups belong is extracted, and the sequences which access the objects common to the sequences belonging to other groups are integrated in this extracted group.

In Step S603, the processing of determining the order for implementing the sequences which is similar to Step S503 shown in FIG. 28 is implemented. Accordingly, each sequence is grouped based on the objects left as reference objects for grouping sequences, and the implementation order of each sequence within a group is determined, and then, such a table as shown in the lower table of FIG. 33 is made.

In Step S604, the processing of dissolving the duplication of sequences which is similar to Step S504 shown in FIG. 28 is implemented. Accordingly, the duplication of the sequences belonging to a plurality of groups among the grouped sequences is dissolved.

In Step S605, the processing of judging whether it is necessary to integrate sequences which are similar to Step S601 is implemented again. If this judgement result in Step S605 is Yes, the process goes back to Step S602 and the above-mentioned processing is repeated. If the judgement result in Step S605 is No, the sequence integration is deemed to have been completed, and the processing of Step S505 (namely, Step S408 in FIG. 27) and the subsequent processing shown in FIG. 28 are implemented.

The division into functional blocks using the sequence integration is realized in this system by making the CPU 301 implement all the above processing as the processing of grouping sequences of Step S407 in the system design processing shown in FIG. 27.

In the division into functional blocks by this system, the information indicating the time required for the implementation of each sequence (time budget) can be given for every sequence in advance, and the time required for the implementation of all the sequences belonging to each functional block can be calculated after the functions required for the system to be designed are divided into functional blocks. By so doing, it becomes possible to judge, in this system, whether the requirements for the performance of the system to be designed in terms of time can be satisfied.

In order to judge, in this system, whether the requirements for the performance of the system to be designed in terms of time can be satisfied, some changes must be added to the processing contents of the system design aid processing implemented by the CPU 301 which are shown by the flowchart in FIG. 27.

Figure 37:
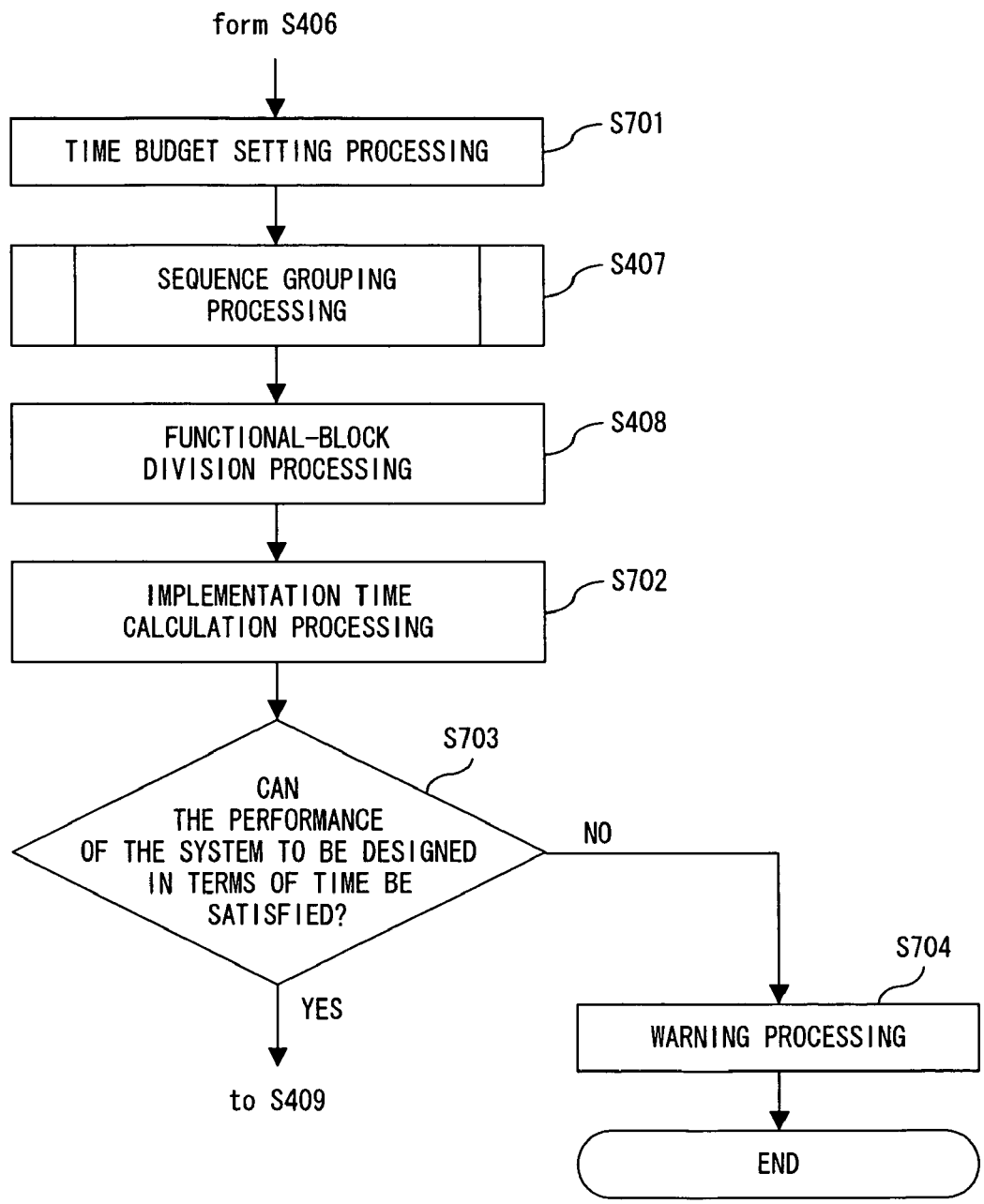
FIG. 37 shows the contents to be changed when the system shown in FIG. 26 is made to judge whether the requirements for the performance of the system to be designed in terms of time are satisfied by changing the system design processing shown in FIG. 27.

The contents of the changes when the system design processing shown in FIG. 27 is changed and this system is made to judge whether the requirements of the performance of the system to be designed in terms of time are satisfied are shown in FIG. 37. The flowchart shown in FIG. 37 is replaced by the processing of Step S407 and Step S408 in FIG. 27.

Following the processing of Step S406 in FIG. 27, the processing of setting a time budget is implemented in Step S701. Accordingly, the contents of operation for the operation input unit 305 by a user is acquired, and the time required for the implementation is set for each sequence shown in the sequence diagrams made by the processing of up to Step S406 based on the operation contents.

Following the processing of Step S701, the processing of grouping sequences in Step S407 and the processing of dividing functions into functional blocks in Step S408 are implemented.

Following the processing of Step S408, the processing of calculating the implementation time is implemented in Step S702. Accordingly, the implementation time set for the sequences belonging to the functional blocks into which the functions have been divided by the processing of up to Step S408 is summed up, and the time required for the implementation of the functional blocks is calculated.

In Step S703, the processing of judging whether the requirements for the performance of a system to be designed in terms of time can be satisfied is implemented. In this judgment processing, the implementation time calculated by the processing of Step S702 and the ratio required for the performance of the system to be designed in terms of time which is anticipated in advance are compared. If this implementation is equal to or less than the required ratio, the judgement result is Yes, and the process proceeds to the processing of Step S409 shown in FIG. 27 and the subsequent processing is implemented. If the implementation time is larger than the required ratio, the judgment result is No, and the process proceeds to Step S704.

In Step S704, the processing of warning is implemented. Accordingly, a warning indication to the effect that the requirements for the performance of the system to be designed in terms of time cannot be satisfied is displayed in the display device 306, and after then, the system design processing is completed.

By making the CPU 301 implement the above processing, it becomes possible to judge, in this system, whether the requirements for the performance of the system to be designed in terms of time can be satisfied.

In the division into functional blocks by this system which has been so far explained, the information indicating the memory capacity required for the implementation of each sequence can be given for every sequence, and the memory capacity required for the implementation of all the sequences belonging to each functional block can be calculated after the functions required for the system to be designed are divided into functional blocks. By so doing, it becomes possible to judge, in this system, whether the requirements for the memory capacity of the system to be designed can be satisfied.

In order to judge, in this system, whether the requirements for the memory capacity of the system to be designed can be satisfied, some changes must be added to the processing contents of the system design aid processing implemented by the CPU 301 which are shown by the flowchart in FIG. 27.

Figure 38:
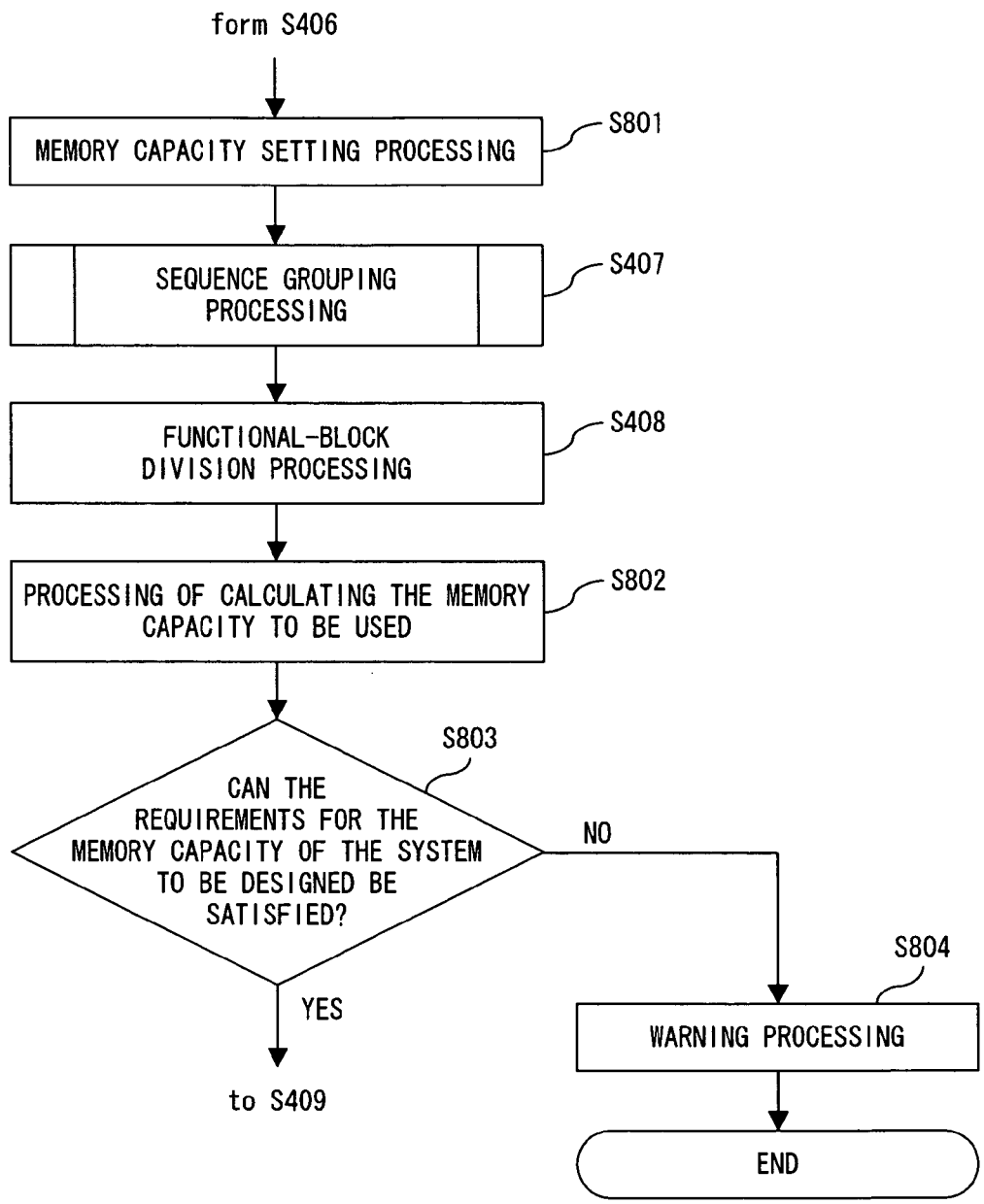
FIG. 38 shows the contents to be changed when the system shown in FIG. 26 is made to judge whether the requirements for the memory capacity of the system to be designed are satisfied by changing the system design processing shown in FIG. 27.

The contents of the changes when the system design processing shown in FIG. 27 is changed and this system is made to judge whether the requirements of the memory capacity of the system to be designed are satisfied are shown in FIG. 38. The flow chart shown in FIG. 38 is replaced by the processing of Step S407 and Step S408 in FIG. 27.

Following the processing of Step S406 in FIG. 27, the processing of setting the memory capacity is implemented in Step S801. Accordingly, the contents of operation for the operation input unit 305 by a user is acquired, and the memory capacity required for the implementation is set for each sequence shown in the sequence diagrams made by the processing of up to Step S406 based on the operation contents.

Following the processing of S801, the processing of grouping sequences in Step S407 and dividing functions into functional blocks in step s408, which is similar to the above-mentioned processing is implemented.

Following the processing of Step S408, the processing of calculating the memory capacity to be used is implemented in Step S802. Accordingly, the memory capacity set for the sequences belonging to the functional blocks into which the functions have been divided by the processing of up to Step S408 is summed up, and the memory capacity required for the implementation of the functional blocks is calculated.

In Step S803, the processing of judging whether the requirements for the memory capacity of a system to be designed can be satisfied. In this judgment processing, the memory capacity calculated by the processing of Step S802 and the ratio required for the memory capacity of the system to be designed which is anticipated in advance are compared. If this memory capacity is equal to or less than the required ratio, the judgement result is Yes, and the process proceeds to the processing of Step S409 shown in FIG. 27 and the subsequent processing is implemented. If the memory capacity is larger than the required ratio, the judgment result is No, and the process proceeds to Step S804.

In Step S804, the processing of warning is implemented. Accordingly, a warning indication to the effect that the requirements for the memory capacity of the system to be designed cannot be satisfied is displayed in the display device 306, and after then, the system design processing is completed.

By making the CPU 301 implement the above processing, it becomes possible to judge, in this system, whether the requirements for the memory capacity of the system to be designed can be satisfied.

In order to carry out the present invention using a standard computer, a control program which makes the computer execute the same processing as implemented by the CPU 301 in this system must be made, and the control program must be read and executed by the computer.

It is also possible to make a computer readable recording medium record the control program, and make the computer read the program from the recording medium and execute the program in order to carry out the present invention.

Figure 39:
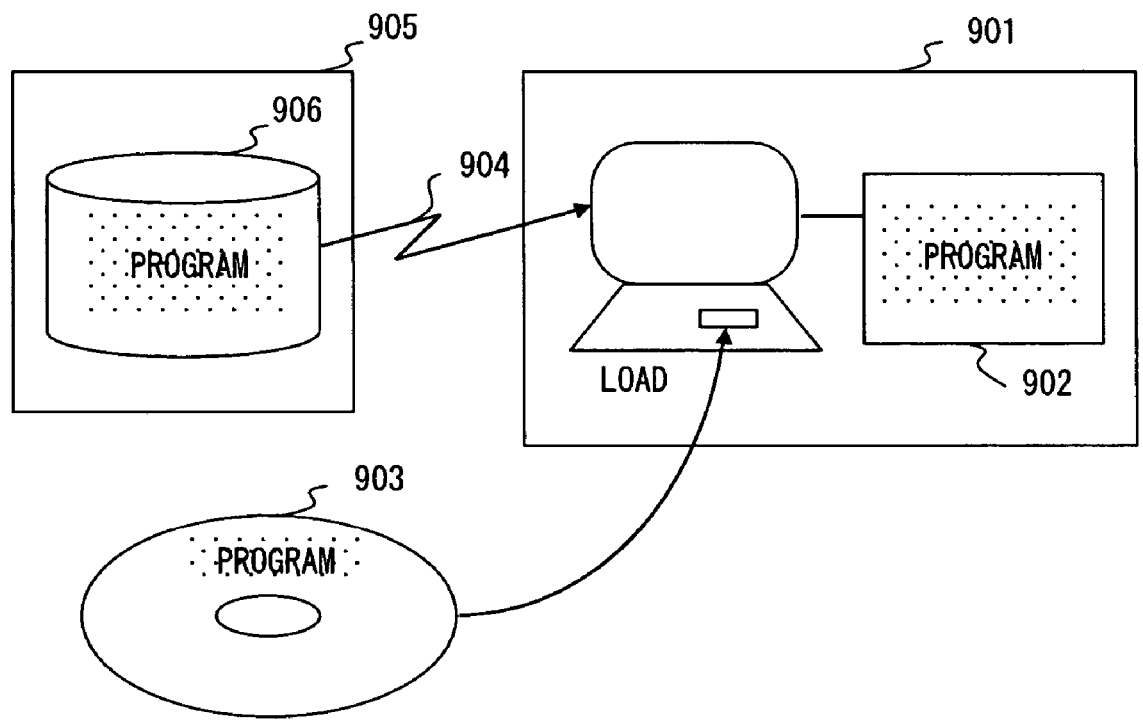
FIG. 39 is an example showing the recording medium which can read a recorded control program by a computer.

An example of the recording medium which can read a recorded control program using a computer is shown in FIG. 39. In FIG. 39, 901 is a computer, 902 is a memory, 903 is a portable recording medium, 904 is a communication circuit, 905 is a program server, and 906 is a storage device.

As the recording medium, for example, a memory 902 such as a hard disk or a ROM built or mounted externally in the computer 901, or a portable type recording medium 903 such as an FD (flexible disk), an MO (magneto-optical disk), a CD-ROM, a DVD-ROM can be used, as shown in FIG. 39. The recording medium can be the storage device 906 which a computer has and which functions as the program server 905 connected to the computer 901 via the communication circuit 904. In this case, a transmission signal obtained by modulating a carrier wave by a data signal indicating a control program is transmitted from the program server 905 via the communication circuit 904, and the control program can be implemented by the computer 901 by demodulating the carrier wave received and reproducing the control program.

The present invention can apply to any system design in either hardware or software.

The present invention is not limited to the above-mentioned embodiments, but various improvements or changes can be made thereto. For example, the sequences necessary to satisfy the specifications required for the system to be designed can be acquired by the method other than the above-mentioned method of applying a system development technology using a UML (unified modeling language).

As has been explained so far, the present invention acquires the relationship between a plurality of sequences, which must be implemented to realize the functions required for a system to be designed, and the objects to and from which the sequences deliver and receive messages, groups the sequences which deliver and receive messages to and from the same object, and makes a group which is associated with the object. When the same sequence belongs to different groups in duplication due to the grouping, the sequence dissolves the duplication of the sequence based on the relationship of the implementation order concerning the object between the sequence and other sequences which deliver and receive messages to and from the object to and from which the sequence delivers and receives messages. Then, the group is associated with the functional blocks, and the sequences belonging to the group corresponding to the functional blocks are outputted as the sequences which are implemented in the functional blocks.

By fulfilling all the above, the present invention produces an effect of reducing the competition among the sequences when the sequences divided to satisfy the specifications required for the system to be designed are distributed into each functional block.

What is claimed is:

1. A functional-block division system for dividing functions required for a system to be designed into a plurality of functional blocks so that the functions may be constituted by a combination of a plurality of functional blocks, the functional-block division system including a computer that executes an operation, the operation comprising:

acquiring the relationship between a plurality of sequences to be implemented to realize the functions and an object to and from which the sequences deliver and receive messages;

grouping the sequences which deliver and receive messages to and from the same object to make a group of sequences associated with the object;

dissolving, when the same sequence belongs to different groups of sequences in duplication, the duplication of the sequence using the relationship, between the sequence and the other sequences which deliver and receive messages to and from the object to and from which the sequence delivers and receives messages, of the implementation order of the object; and outputting the sequence belonging to the group of sequences associated with the functional blocks as a sequence which associates each group with the functional blocks and makes the functional blocks implement the sequence.

2. A functional-block division method for dividing functions required for a system to be designed into a plurality of functional blocks so that the functions may be constituted by a combination of a plurality of functional blocks, the functional-block division method causing a computer to execute an operation, the operation comprising:

acquiring the relationship between a plurality of sequences to be implemented to realize the functions and an object to and from which the sequences deliver and receive messages;

grouping the sequences which deliver and receive messages to and from the same object to make a group of sequences associated with the object;

dissolving, when the same sequence belongs to different groups of sequences in duplication, the duplication of the sequence using the relationship, between the sequence and the other sequences which deliver and receive messages to and from the object to and from which the sequence delivers and receives messages, of the implementation order of the object which delivers and receives massages to and from the sequence; and outputting the sequence belonging to the group of sequences associated with the functional blocks as a sequence which associates each group with the functional blocks and makes the functional blocks implement the sequence.

3. A physical recording medium in which a program which directs a computer to perform the processing of dividing functions required for a system to be designed into a plurality of functional blocks so that the functions may be constituted by a combination of a plurality of functional blocks is recorded, and the program causes the computer to execute an operation, the operation comprising:

acquiring the relationship between a plurality of sequences to be implemented to realize the functions and an object to and from which the sequences deliver and receive messages;

grouping the sequences which deliver and receive messages to and from the same object to make a group of sequences associated with the object;

dissolving, when the same sequence belongs to different groups of sequences in duplication, the duplication of the sequence using the relationship, between the sequence and the other sequences which deliver and receive messages to and from the object to and from which the sequence delivers and receives messages, of the implementation order of the object; and outputting the sequence belonging to the group of sequences associated with the functional blocks as a sequence which associates each group with the functional blocks and makes the functional blocks implement themselves.

4. The physical recording medium according to claim 3, wherein the computer is made to implement the processing of excluding the object to and from which all the sequences deliver and receive messages from the grouping standard in order to make the groups of sequences.

5. The physical recording medium according to claim 3, wherein the computer is made to implement the processing of excluding the object to and from which only one of a plurality of sequences delivers and receives messages from the grouping standard in order to make the groups of sequences.

6. The physical recording medium according to claim 3, wherein the computer is directed to perform the process of excluding the object in which no data is written by any of a plurality of sequences which deliver and receive messages to and from the object from the grouping standard in order to make the groups of sequences.

7. The physical recording medium according to claim 3, the operation further comprising:

determining the implementation order of each sequence belonging to the groups made by the grouping processing using the relationship of the implementation order of the object with which the groups are associated, and wherein the outputting outputs the sequences belonging to the groups associated with functional blocks and the information indicating the implementation order of the sequences in the groups.

8. The physical recording medium according to claim 3, the operation further comprising:

acquiring the relationship using the information obtained from the scenario in which the contents of action to be taken to realize the use case showing the contents of the functions are described.

9. The physical recording medium according to claim 3, the operation further comprising:

integrating, when a plurality of sequences which belong to other groups different from the group made by the grouping in duplication belong to the group made by the grouping, a plurality of sequences into one sequence and making the integrated sequence belong to said group, and wherein the dissolving dissolves the duplication of the sequences which include the one integrated by the integrating.

10. The physical recording medium according to claim 3, the operation further comprising:

acquiring information indicating the implementation time required to implement the sequences in the system to be designed; and acquiring an implementation time required to implement the sequences in the functional blocks in the system to be designed by calculating the sum total of the implementation time of each sequence outputted as the sequences to be implemented in the functional blocks by the outputting.

11. The physical recording medium according to claim 3, the operation further comprising:

acquiring information indicating the memory capacity required to implement, in the system to be designed, each of a plurality of sequences whose implementation is required to realize the functions required for the system to be designed: and acquiring a memory capacity required to implement the sequences as the functional blocks in the system to be designed by calculating the sum total of the memory capacity for each sequence outputted as the sequences to be implemented in the functional blocks by the outputting.

* * * * *